(12) United States Patent
Kim et al.

(10) Patent No.: US 9,380,551 B2
(45) Date of Patent: Jun. 28, 2016

(54) METHOD AND TERMINAL FOR PERFORMING DETACH PROCEDURE

(75) Inventors: Jaehyun Kim, Anyang-si (KR);
Laeyoung Kim, Anyang-si (KR);
Taehyeon Kim, Anyang-si (KR);
Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/528,683

(22) Filed: Jun. 20, 2012

(65) Prior Publication Data
US 2013/0012204 A1 Jan. 10, 2013

Related U.S. Application Data

(60) Provisional application No. 61/542,784, filed on Oct. 3, 2011, provisional application No. 61/505,541, filed on Jul. 8, 2011.

(30) Foreign Application Priority Data

May 17, 2012 (KR) ........................ 10-2012-0052680

(51) Int. Cl.
*H04W 72/04* (2009.01)
*H04W 60/06* (2009.01)
*H04W 4/00* (2009.01)

(52) U.S. Cl.
CPC .............. *H04W 60/06* (2013.01); *H04W 4/005* (2013.01)

(58) Field of Classification Search
CPC ...................................................... H04W 60/06
See application file for complete search history.

(56) References Cited

U.S. PATENT DOCUMENTS

| 2010/0081435 A1* | 4/2010 | Huang ................... 455/435.1 |
| 2012/0063300 A1* | 3/2012 | Sahin et al. ................ 370/225 |
| 2012/0275401 A1* | 11/2012 | Sun ............................ 370/329 |

OTHER PUBLICATIONS

3GPP TSG CT WG1 Meeting #72, "Detach Procedure with type re-attach required", Jun. 27, 2011, Huawei, Hisilicon, Nokia Siemens Networks, LG Electronics, C1-112557, pp. 1-3.*
3rd Generation Partnership Project (3GPP), "Technical Specification Group Core Network and Terminals; Non-Access-Stratum(NAS) protocol for Evolved Packet System (EPS); Stage 3 (Release 10)", 3GPP TS 24.301 V10.3.0, Jun. 2011, 316 pages (Relevant clauses: 5.5.2.3; 8.2.10; 8.2.11; and 9.9.3.7).
3rd Generation Partnership Project (3GPP), "Technical Specification Group Core Network and Terminals; Mobile radio interface Layer 3 specification; Core networks protocols; Stage 3 (Release 10)", 3GPP TS 24.008 V10.3.0, Jun. 2011, 638 pages (Relevant clauses: 4.7.4.2; 9.4.5; 9.4.6; and 10.5.5.5).
3rd Generation Partnership Project (3GPP), "Technical Specification Group Services and System Aspects; System Improvements for Machine-Type Communications; (Release 10)", 3GPP TR 23.888 V1.0.0, Jul. 2010, 80 pages (Relevant clauses: 5.12.2; and 6.20).

(Continued)

*Primary Examiner* — Olumide T Ajibade Akonai
*Assistant Examiner* — Randy Peaches
(74) *Attorney, Agent, or Firm* — Lee, Hong, Degerman, Kang & Waimey; Jonathan Kang; Michael Monaco

(57) ABSTRACT

Disclosed is a method for performing a detach procedure in a terminal. The method includes the steps of: receiving a detach request message from an entity within a network; if the type in the detach request message indicates "re-attach required", stopping a first timer if the first timer is running; stopping a second timer if the second timer is running, and transmitting a detach accept message to the entity within the network.

16 Claims, 19 Drawing Sheets

(56) References Cited

OTHER PUBLICATIONS

PCT International Application No. PCT/KR2012/004659, Notification of Transmittal of the International Search Report and the Written Opinion of the International Searching Authority, or the Declaration dated Nov. 30, 2012, 9 pages.

Huawei, et al., "Detach procedure with type "re-attach required"," 3GPP TSG CT WG1 Meeting #72, C1-112557, Jun. 2011, 3 pages.

LG Electronics, "Correction of T3396 handling for PDN connection reactivation," 3GPP TSG-CT WG1 Meeting #71, C1-112176, May 2011, 6 pages.

Huawei, et al., "Correction to network-initiated detach procedure," 3GPP TSG CT WG1 Meeting #72, C1-112770, Jun. 2011, 7 pages.

LG Electronics, "Correction of T3496 handling for PDN connection reactivation," 3GPP TSG-CT WG1 Meeting #71, C1-111886, XP050481225, May 2011, 8 pages.

European Patent Office Application Serial No. 12812074.8, Search Report dated Feb. 5, 2015, 5 pages.

\* cited by examiner

FIG. 4
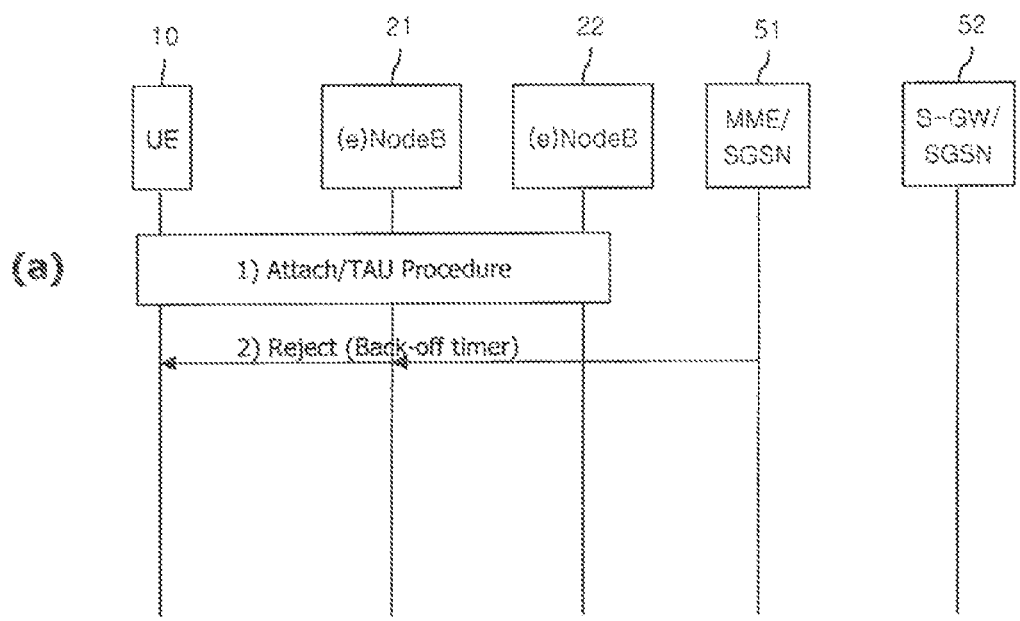
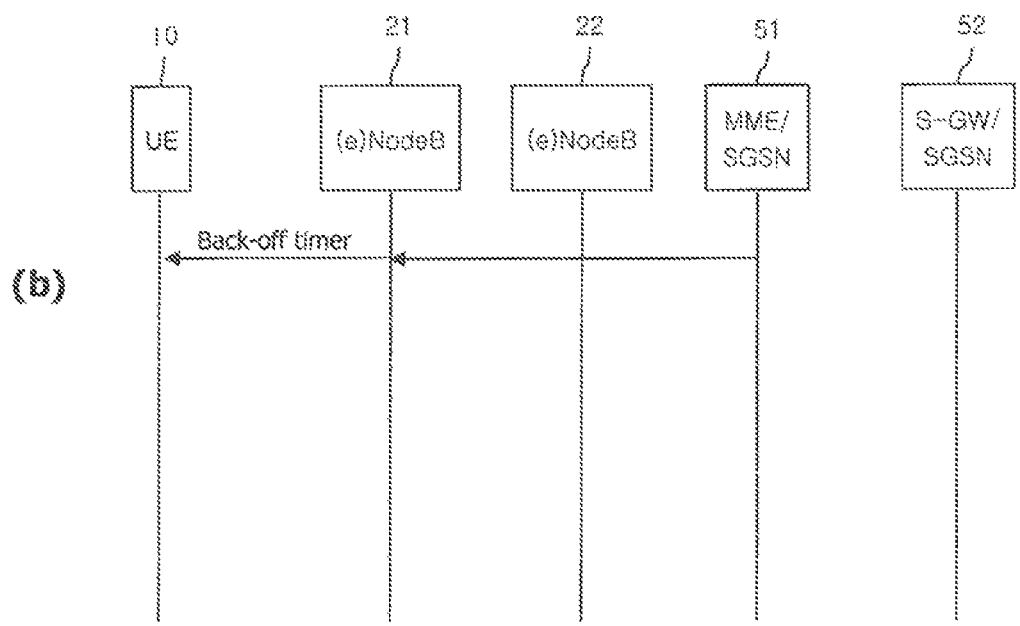

METHOD AND TERMINAL FOR PERFORMING DETACH PROCEDURE

CROSS-REFERENCE TO RELATED APPLICATION

Pursuant to 35 U.S.C. §119, this application claims the benefit of earlier filing date and right of priority to Korean Application No. 10-2012-0052680, filed on May 17, 2012, and also claims the benefit of U.S. Provisional Application Ser. Nos. 61/542,784, filed on Oct. 3, 2011, and 61/505,541, filed on Jul. 8, 2011, the contents of which are all incorporated by reference herein in their entirety.

TECHNICAL FIELD

The present invention relates to a method and terminal for performing detach procedure.

BACKGROUND ART

In order to meet a variety of forums and new technologies related to the 4th generation mobile communications, the 3rd Generation Partnership Project (3GPP) which aims to provide technical specifications of the 3rd generation mobile communications system has proceeded with research for the Long Term Evolution/System Architecture Evolution (LTE/SAE) technologies since year-end 2004 as a part of efforts to optimize and enhance performances of the 3GPP technologies.

The SAE mainly led by the 3GPP SA WG2 relates to research of network technologies which aims to determine a network structure together with the LTE work of the 3GPP TSG RAN and to support mobility between networks of different versions. Recently, the SAE has been considered one of the essential standardization issues of the 3GPP. Such work is to develop the 3GPP to be a system based on the IP and supporting a variety of radio (wireless) connection technologies, and has progressed with the aim of an optimized packet-based system capable of minimizing a transmission delay with enhanced data transmission capability.

The SAE upper level reference model defined by the 3GPP SA WG2 may include a non-roaming case and roaming cases with a variety of scenarios. Detailed descriptions thereof are given in 3GPP TS 23.400a and TS 23.400b. FIG. 1 is a schematic reconfiguration diagram of such network structure.

FIG. 1 is view of an evolved mobile communication network.

One of the distinctive characteristics of the network structure shown in FIG. 1 is that it is based on a 2 tier model having an eNode B of the Evolved UTRAN and a gateway of the core network. The eNode B 20 has a similar function, although not exactly the same, to the eNode B and RNC of the existing UMTS system, and the gateway has a function similar to the SGSN/GGSN of the existing system.

Another distinctive characteristic is that different interfaces are exchanged by the control plane and the user plane between the access system and the core network. While an Iu interface exists between the RNC and SGSN in the existing UMTS system, two separate interfaces, i.e., S1-MME and S1-U, are used in the Evolved Packet Core (SAE) system since the Mobility Management Entity (MME) 51 which handles the processing of a control signal is structured to be separated from the gateway (GW).

For the GW, there are two types of gateways: a Serving Gateway (hereinafter, 'S-GW') 52 and a Packet Data Network gateway (hereinafter, 'PDN-GW' or 'P-GW') 53.

FIG. 2 shows the structure and communication process of an MTC device.

A Machine Type Communication (MTC) device may be used in a mobile communication system. The MTC refers to data communications between machines performed without human interference, and a device used for these communications is referred to as an MTC device. A service provided by the MTC device is different from a communication service performed with human interference, and may be applied to a variety of services.

The aforementioned MTC device is a communication device is a communication device that performs communication between machines, which is not much different from a UE that needs human interaction, except that it needs no human interaction. That is, the MTC device may correspond to a UE that needs no human interaction. However, from the viewpoint that no human interaction is needed, if a message transmission/reception method (e.g., paging message transmission/reception method) for a UE that needs human interaction is fully applied to the MTC device, some problems may occur.

Referring to FIG. 2, when a measuring service, a road information service, a user electronic equipment calibration service, or the like, provided by the MTC device, received by an eNB, the eNB may transmit it to an MTC server, and therefore the MTC user may use the service.

It is often the case that the MTC device performs communication alone in a place that needs no human interference since it performs communication without human interaction.

FIG. 3 is a conceptual diagram showing a 3GPP service model for supporting MTC.

Although GSM/UMTS/EPS with the 3GPP standards for supporting MTC are defined to perform communication over a PS network, the present specification describes a method applicable to a CS network as well.

In the current technical specification, the use of an existing 3GPP bearer is suggested for the definition of the network structure. A method using a short message service (SMS) for data exchange between an MTC device and an MTC server was proposed as one of alternative solutions. The use of SMS was proposed, considering that a small amount of digital data including meter reading information and product information will be an object of an MTC application in view of the characteristics of the MTC application, by which an existing SMS method and an IMS-based SMS method can be supported.

In FIG. 2, MTCsms is a data exchange interface using an existing SMS method, and MTCi is a data exchange interface for a 3GPP bearer service and IMS.

In the current 3GPP standards, three architecture models for MTC are defined as follows: a Direct Model, an Indirect Model, a Hybrid Model, and so on. The Direct Model is a model in which an MTC application is connected directly to an UE over a 3GPP network and performs communication under the control of a 3GPP network provider. The Indirect Model includes two models: a model in which an MTC application is connected to an MTC server outside a 3GPP network to perform communication with a UE under the control of an MTC service provider; and a model in which an MTC server exists within a 3GPP network and an MTC application is connected to an UE to perform communication under the control of a 3GPP network provider. The Hybrid Model involves the co-existence of the Direct Model and Indirect Model. For example, user plane is a method of communication using the Direct Model and control plane is a method of communication using the Indirect Model.

As described above, Machine Type Communication (MTC) involves communication performed between machines, which may result in overload in some cases. For example, overload may be generated due to the following reasons:

there is a malfunctioning in the MTC server or MTC application;

an external event triggers MTC devices to attach/connect; and a large number of MTC devices are configured such that a specific program is repeatedly operated at a specific time.

To resolve the problem of such network congestion or overload, a network node can reject a specific access. Such an access restriction is enabled according to an APN (i.e., congested APN) or MTC group. Such access restriction may cause the network node to transmit a back-off time to the MTC device and provide information about restricting access and session setup until the duration of the back-off time expires.

The network node may set the back-off time by using a randomization method. Also, the access start time is randomized to prevent simultaneous congestion at a specific point of time.

FIG. 4 shows a procedure of rejecting access from an UE in case of network congestion or overload.

As can be seen with reference to FIG. 4(a), when a UE 10 performs an attach or tracking area update (TAU) procedure through a first (e)NodeB 21 in case of network congestion or overload, a node, e.g., MME/SGSN 51, within the network rejects the attach or TAU request according to a network situation such as an operator policy.

Also, the MME/SGSN 51 may transmit a back-off time when it performs the rejection so that the UE 10 does not have to attempt access until expiry of the back-off time.

At this point, the UE 10 does not have to perform an attach or TAU procedure through a second (e)Node 22 based on the back-off time.

Alternatively, as shown in FIG. 4(b), in case of network congestion or overload, a node, e.g., MME/SGSN 51, within the network may transmit a back-off time to the UE 10 through the first (e)nodeB 21 according to a network situation such as an operator policy.

Then, the UE 10 does not have to perform an attach or TAU procedure through the second (e)Node 22 based on the back-off time.

FIG. 5 is a view showing a relation between (e)NodeB and Home (e)NodeB.

In the 3rd or 4th generation mobile communication systems, attempts continue to increase their cell capacity in order to support high-capacity and bi-directional services such as multimedia contents, streaming, and the like.

In other words, with the development of communication and widespread multimedia technologies, various high-capacity transmission technologies are required, and accordingly, a method of allocating more frequency resources is used to increase radio capacity, but there is a limit to allocate more frequency resources to a plurality of users with restricted frequency resources.

In order to increase cell capacity, there has been an approach in which high frequency bandwidth is used and the cell diameter is reduced. If a cell having a small cell radius such as a pico cell is applied, it is possible to use a higher bandwidth than the frequency that has been used in the existing cellular system, thereby providing an advantage capable of transmitting more information. However, more base stations should be installed in the same area, thereby having a disadvantage of high investment cost.

In recent years, a femto base station such as Home (e)NodeB 30 has been proposed among the approaches for increasing cell capacity using such a small cell.

Studies on the Home (e)NodeB 30 have been started by 3GPP Home (e)NodeB WG3, and also in recent years, actively proceeded by 3GPPSA WG2.

The (e)NodeB 20 illustrated in FIG. 5 corresponds to a macro base station, and the Home (e)NodeB 30 illustrated FIG. 5 may be a femto base station. This specification will be described based on the terms of 3GPP, and the term (e)NodeB is used when referring to both NodeB and eNodeB. Also, the term Home (e)NodeB is used when referring to both Home NodeB and Home eNodeB.

The interface illustrated in a dotted line denotes the transmission of control signals between the (e)NodeB 20 or Home (e)NodeB 30 and the MME 510. Also, the interface illustrated in a solid line denotes the transmission of data of the user plane.

FIG. 6 shows a network overload state.

As illustrated in FIG. 6, if traffic is overloaded or congested at an interface between the (e)NodeB 20 and the S-GW 52, or traffic is overloaded or congested at an interface between the Home (e)NodeB 30 and the S-GW 52, then downlink data to the UE 10 or upload data from the UE 10 is failed to be properly transmitted.

Also, if an interface between the S-GW 52 and the PDN-GW 53 or an interface between the PDN-GW 53 and an Internet Protocol (IP) service network of the mobile communication operator is overloaded or congested, then downlink data to the UE 10 or upload data from the UE 10 is failed to be properly transmitted.

Also, when UE is handed over from a cell being currently serviced to another cell, if the another cell is overloaded, then it will cause a problem of dropping the service of the UE.

In order to solve the foregoing problem, mobile communication operators have changed the S-GW 52 and the PDN-GW 53 to high-capacity devices or have installed more new devices, but it has a disadvantage of requiring very high cost. Furthermore, it has a disadvantage that the amount of transmitted or received data increases exponentially over time, and then overloaded in a short time.

On the other hand, various schemes for optimizing the S-GW 52 and the PDN-GW 53 without installing more mobile communication networks as described above have been presented. For example, there has been presented a technology of making a selected IP traffic offload, namely, SIPTO, in which an optimal path is selected to transmit specific IP traffic (for instance, Internet service) of the UE in a macro access network, and the IP traffic is offloaded to a path through nodes of a public network that is not the mobile communication network, i.e., nodes of a wired network, in a Femto access network (e.g., Home (e)NB), without transmitting or receiving the IP traffic via a path over the mobile communication network.

FIG. 7 shows the concept of Selected IP Traffic Offload (SIPTO).

Referring to FIG. 7, a mobile communication system such an Evolved Packet System (EPS) is illustrated in an exemplary manner. The EPC system may include (e)NodeB 20, MME 51, S-GW 52, and P-GW 53. Furthermore, Home (e)NodeB 30 is illustrated therein.

As illustrated in the drawing, the Selected IP Traffic Offload (SIPTO) technology may allow specific IP traffic (for instance, Internet service) of the UE 10 to be offloaded to nodes of a wired network 70 without passing through nodes within an IP service network 60 of the mobile communication operator.

For example, if the UE 10 is allowed to access the Home (e)NodeB 30, then the UE 10 can create a session passing through the wired network 70 such as a public communication network over the (e)NodeB 20 and perform an IP network service through the session. At this time, operator policy and subscription information may be considered.

This type of local gateway is called a local GGSN or local P-GW. The function of the local GGSN or local P-GW is similar to that of a GGSN or P-GW.

FIG. 8 shows the problem that the SIPTO technology is not applicable when a back-off time for preventing overload is used according to the conventional art. FIG. 9 is a procedural flowchart illustrating the situation of FIG. 8.

Referring to FIG. 8, a mobile communication system such an Evolved Packet System (EPS) is illustrated in an exemplary manner. The EPC system may include a base station 30, local P-GW 40, MME 51, S-GW 52, and P-GW 53. Furthermore, the base station 30 may be (e)NodeB or Home(e)NodeB.

The local gateway 40 is located between the base station 30 and the wired network 70, which is a gateway for enabling SIPTO through the base station 30. The local gateway 40 is allowed to create a session through a path between the base station 30 and the wired network 70.

The local gateway 40 may include part or all of the functions of PDN_GW for an EPS system, or may include part or all of the functions of gateway GPRS support node (GGSN) for UMTS. However, the local gateway 40 may be allowed to generate a bearer through a path between the base station 30 and the wired network 70, and therefore, it is differentiated from P-GW 52 of EPS or GGSN or GGSN of UMTS that generates a bearer through a path to the mobile communication network 60. Thus, it may be called a local P-GW in EPS, or may be called a local GGSN in UMTS.

On the other hand, though the system illustrated in FIG. 8 is on the basis of EPS, SIPTO illustrated in FIG. 8 may be also applied to a 3GPP Universal Mobile Telecommunication System (UMTS). In the 3GPP UMTS, both the function of the control plane in MME 51 and the function of the user plane in S-GW 52 may be carried out in a Serving GPRS Support Node (SGSN) (not shown).

The operation will be described below with reference to FIGS. 8 and 9.

If the UE 10 sends a service request, then SGSN or MME, which is a control entity within the core network, determines whether data of the service requested by the UE 10 can be offloaded to the wired network 70. That is, as can be seen with reference to FIG. 9, when the UE 10 transmits an Attach Request or TAU Request message to the base station 30, the base station 30 transmits an S1-AP interface-based Initial UE message to the MME 51, and the MME 51 transmits an Attach Accept or TAU Accept message to the UE 10. Next, the MME 51 determines whether to apply the SIPTO technology to traffic of the UE.

An access point provided through the wired network 70 such as a public network may be identical to the mobile communication network 60. Accordingly, the same Access Point Name (APN) indicating the name of an access point may be used, and SPTO permission may be designated for each APN.

In this manner, the UE 10 provides a specific APN to an entity within the core network when attempting an access, and thus an entity of the core network, for instance, MME 51 or Serving GPRS Support Node (SGSN) of EPC can determine whether or not an access of the UE 10 is offloaded to nodes of the wired network 70, such as a public network. At this time, a control entity within the core network, for instance, the MME 51, may determine whether data by the requested service is to be offloaded to the wired network 70 such as a public network by considering whether a base station accessed by the UE 10 is the (e)NodeB or Home(e)NodeB, or whether SIPTO is supported by the base station.

If it is determined that the data is offloaded, then a control entity within the core network, e.g., the MME 51, transmits a Detach Request message to the UE 10. The Detach Request message is for a re-attach procedure. As used herein, the re-attach procedure may be used to apply the SIPTO technology.

However, if the UE 10 operates the back-off timer, the UE 10 cannot perform re-attach due to the back-off time.

DISCLOSURE OF THE INVENTION

Therefore, an object of the present invention is to provide a solution to the above-described problems.

To achieve these and other advantages and in accordance with the purpose of the present invention, as embodied and broadly described herein, there is provided a method for performing congestion control efficiently at an NAS level when congestion or overload occurs in a network. A UE (MS) operates a back-off timer and controls the back-off timer not to perform the functions including attach, TAU and RAU<service request, session setup, change, etc. before expiry to prevent worsening of network congestion. In some situations, it is unclear how to handle the back-off timer when a network sends the UE a request for detach with re-attach required.

Accordingly, the present specification proposes an efficient method for controlling network congestion by controlling a back-off timer efficiently when a network sends a UE a request for detach with re-attach required.

More specifically, the present specification provides a method for performing a detach procedure in a terminal. The method may include the steps of: receiving a detach request message from an entity within a network; if the type in the detach request message indicates "re-attach required", stopping a first timer if the first timer is running; stopping a second timer if the second timer is running, and transmitting a detach accept message to the entity within the network.

The first timer may be a mobility management (MM) timer.

The first timer may be run when attach, tracking area update/routing area update, or a service is rejected, or when congestion of a core network is indicated, or according to signaling from a lower layer.

Upon expiry of the first timer, attach may be initiated, tracking area update/routing area update may be performed, or a service request procedure may be performed.

The second timer may be a session management (SM) timer.

The second timer may be run when Activate PDP Context, Activate MBMS Context, Activate Secondary PDP Context, Modify PDP Context, PDP connectivity, Bearer Resource Modification, or Bearer Resource Allocation is rejected.

Upon expiry of the second timer, Activate PDP Context request, Activate Secondary PDP Context request, Modify PDP Context request, Activate Default EPS Bearer Context Request, Activate Dedicated EPS Bearer request, or Modify EPS Bearer Context request may be made.

The method may further include deactivating EPS Bearer Context including Default EPS Bearer Context without signaling with nodes within the network if the detach type in the detach request message indicates "re-attach required".

The method may further include entering an EMM deregistered state after transmitting the detach accept message to the entity within the network.

The method may further include: releasing the existing NAS signaling connection after completion of a detach procedure; and performing an attach procedure.

The present specification further provides a terminal. The terminal may include: a receiver configured to receive a detach request message from an entity within a network; a controller configured to, if the type in the detach request message indicates "re-attach required", stop a first timer if the first timer is running and stop a second timer if the second timer is running; and a transmitter configured to transmit a detach accept message to the entity within the network.

The first timer may be a mobility management (MM) timer, and the second timer may be a session management (SM) timer.

The present invention has the following advantages.

Firstly, unnecessary reattach between a terminal and a network and service/communication connection delay can be prevented in a machine type communication (MTC) environment of a 3GPP GSM/UMTS/EPS system.

Moreover, according to the disclosure of this specification, service interruption can be prevented in case of SIPTO.

Furthermore, according to the disclosure of this specification, unnecessary network resource can be avoided, and resource utilization can be optimized.

BRIEF DESCRIPTION OF THE DRAWINGS

FIG. 4 shows a procedure of rejecting access from an UE in case of network congestion or overload;

MODES FOR CARRYING OUT THE PREFERRED EMBODIMENTS

Figure 1:
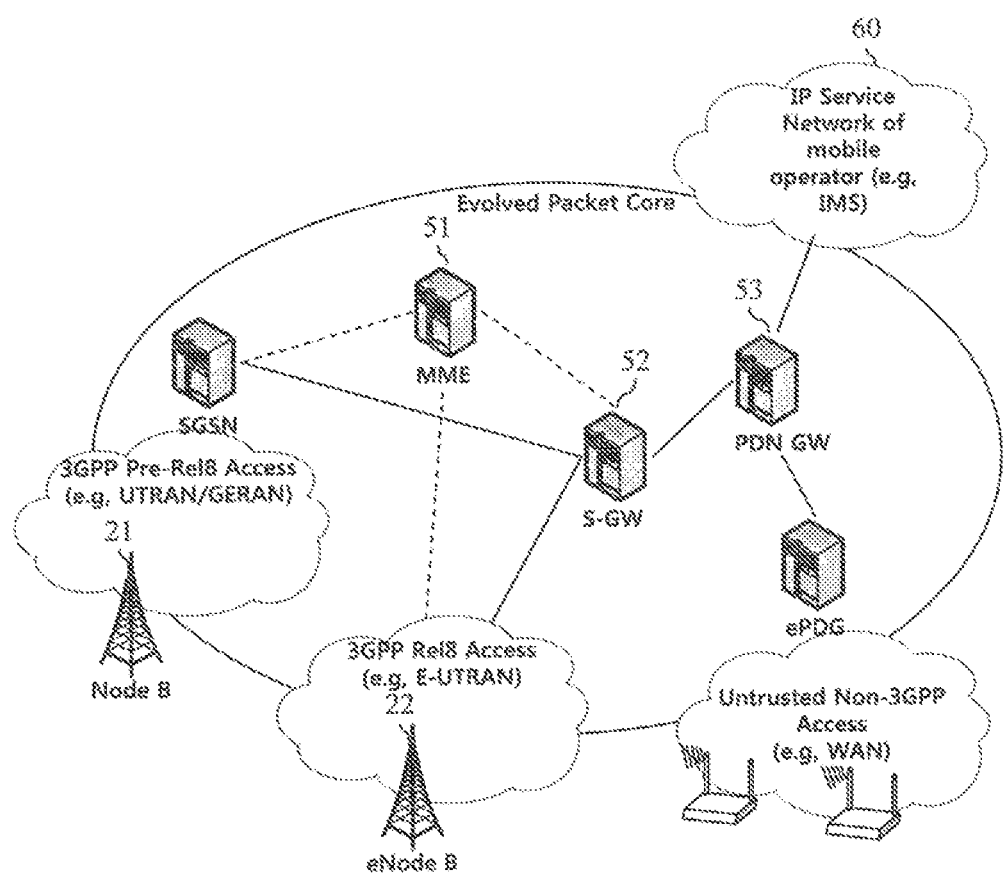
FIG. 1 is view of an evolved mobile communication network.
Figure 2:
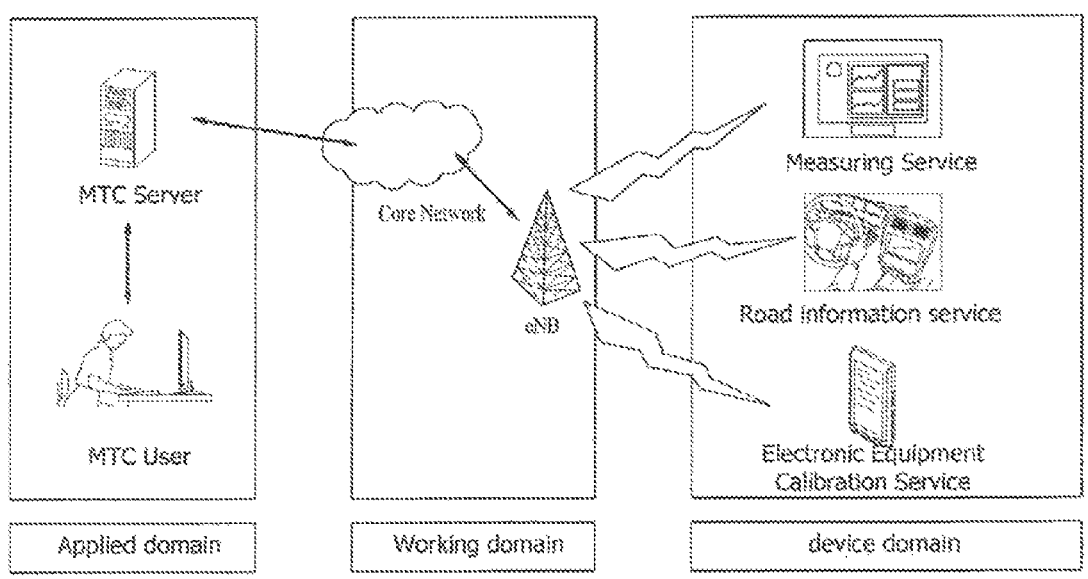
FIG. 2 shows the structure and communication process of an MTC device.
Figure 3:
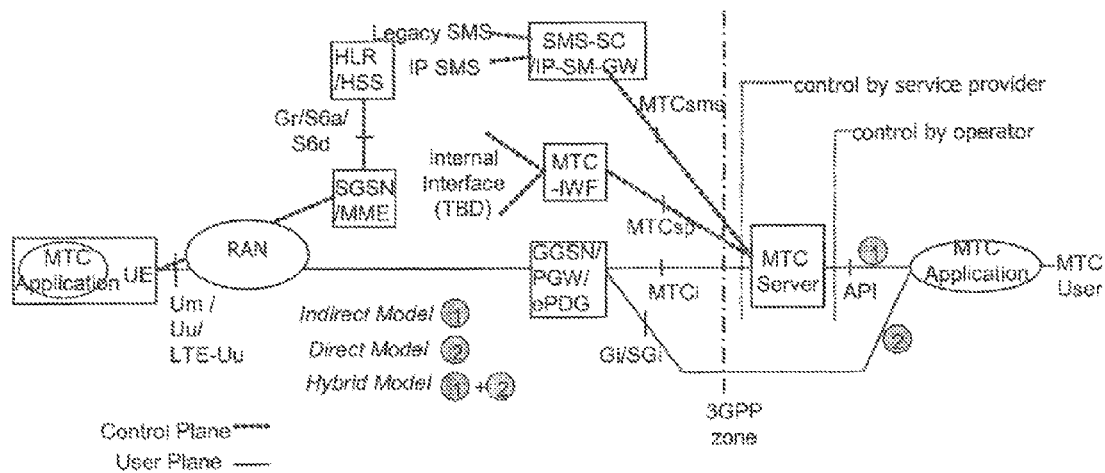
FIG. 3 is a conceptual diagram showing a 3GPP service model for supporting MTC.
Figure 5:
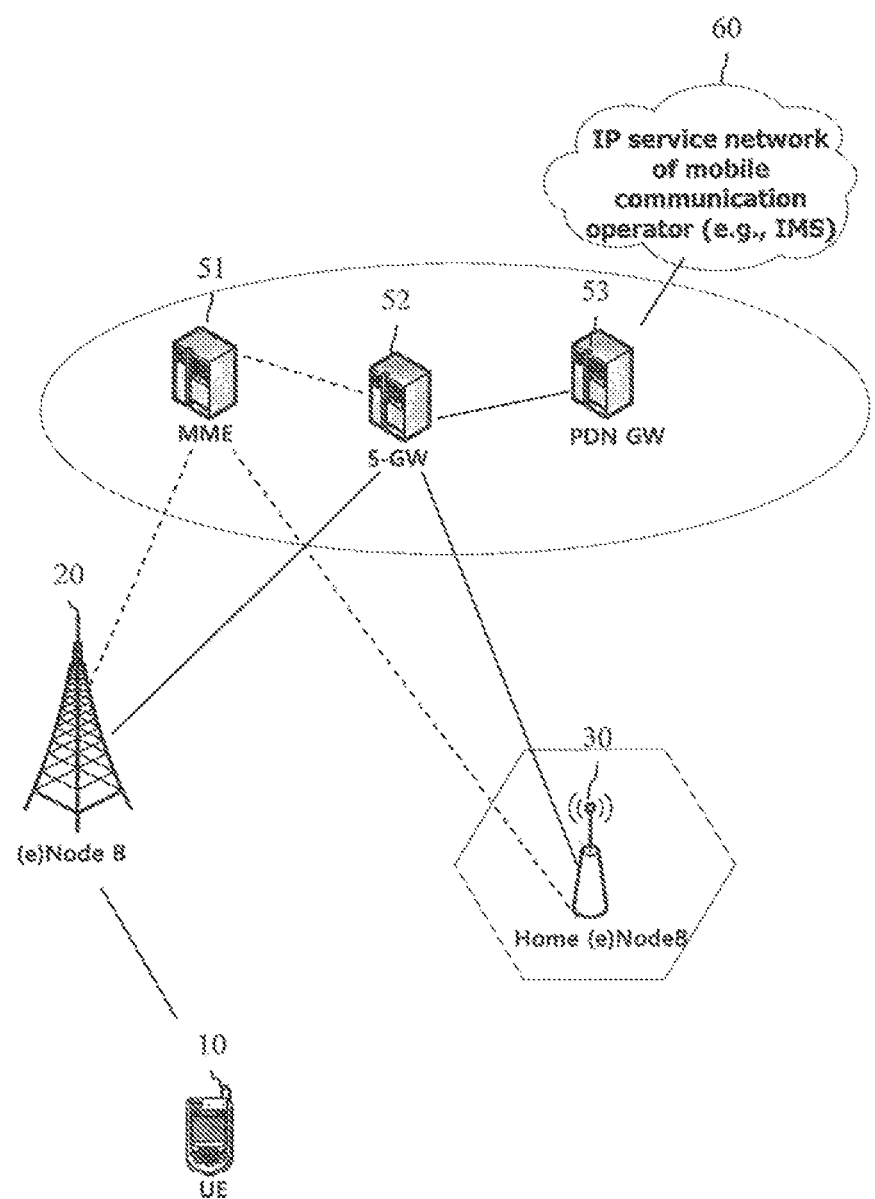
FIG. 5 is a view showing a relation between (e)NodeB and Home (e)NodeB.
Figure 6:
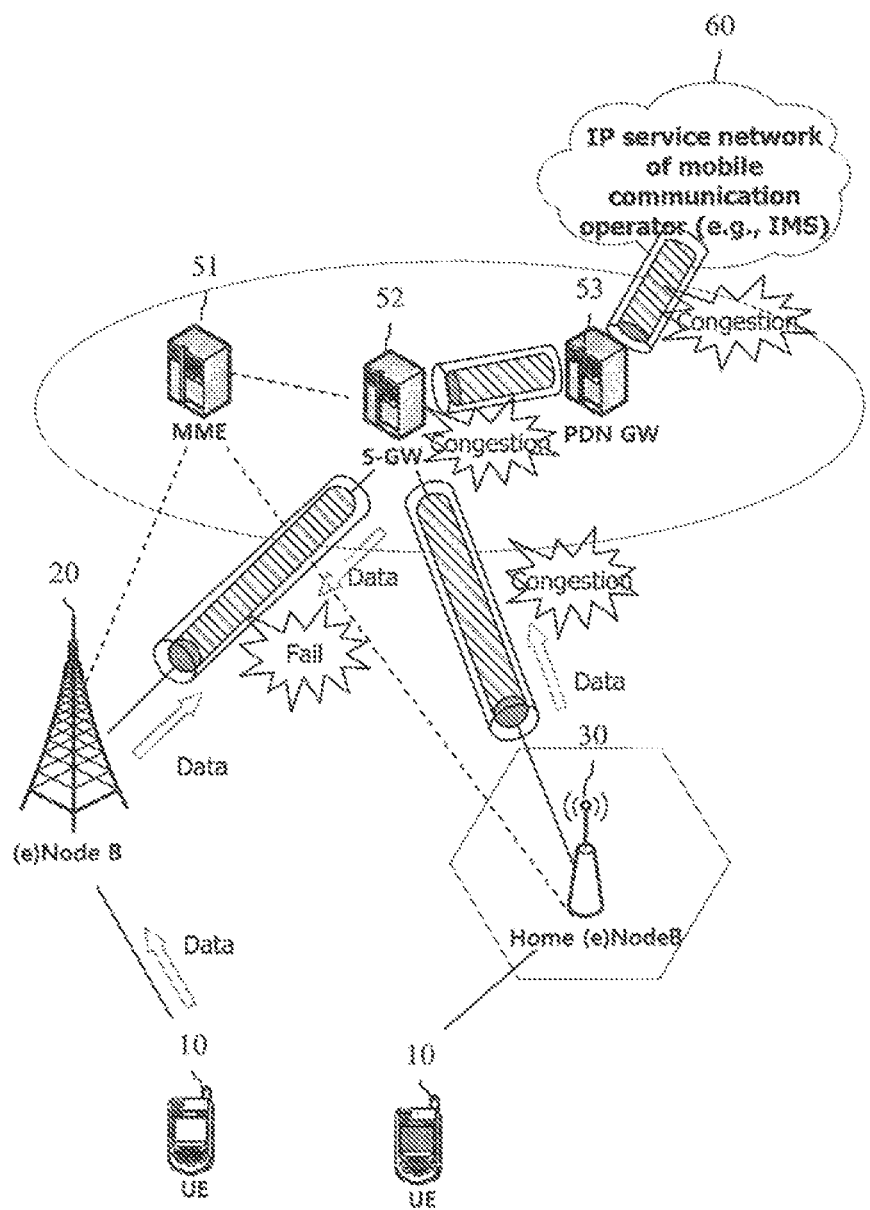
FIG. 6 shows a network overload state.
Figure 7:
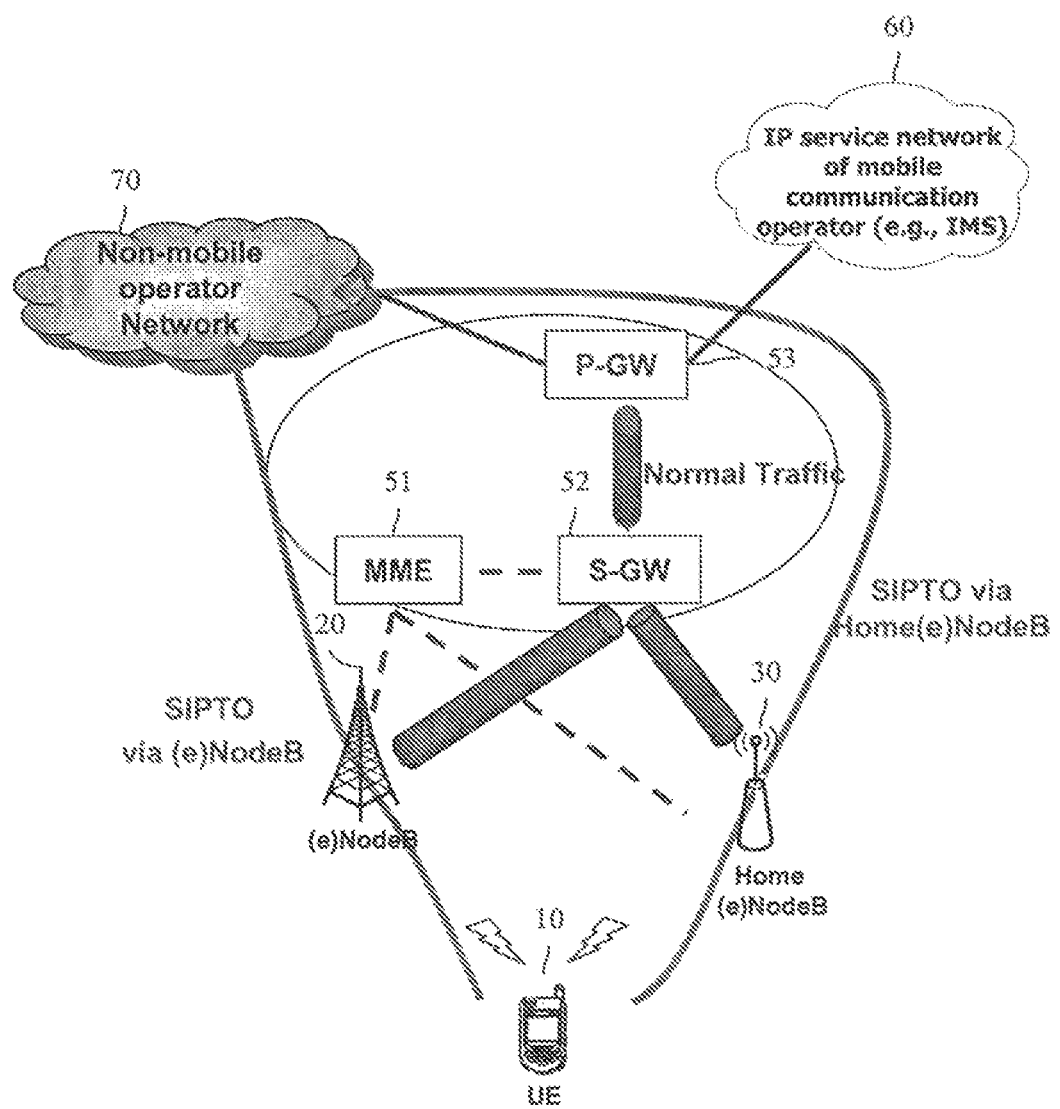
FIG. 7 shows the concept of Selected IP Traffic Offload (SIPTO)
Figure 8:
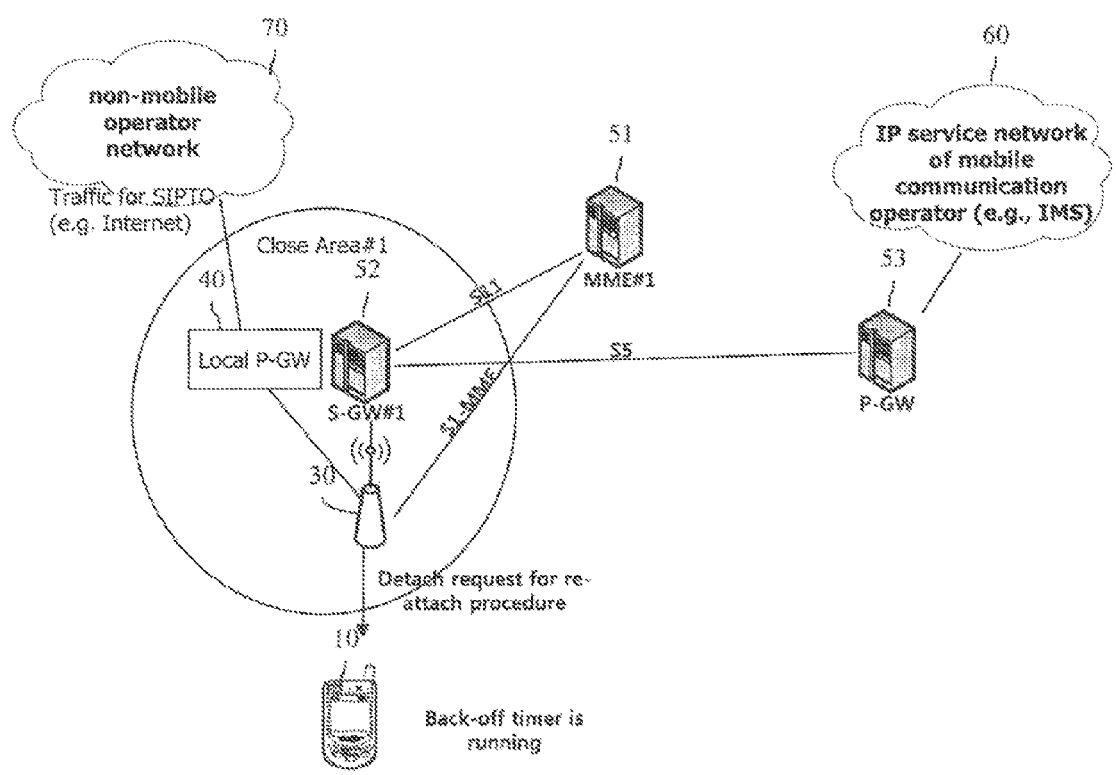
FIG. 8 shows the problem that the SIPTO technology is not applicable when a back-off time for preventing overload is used according to the conventional art.
Figure 9:
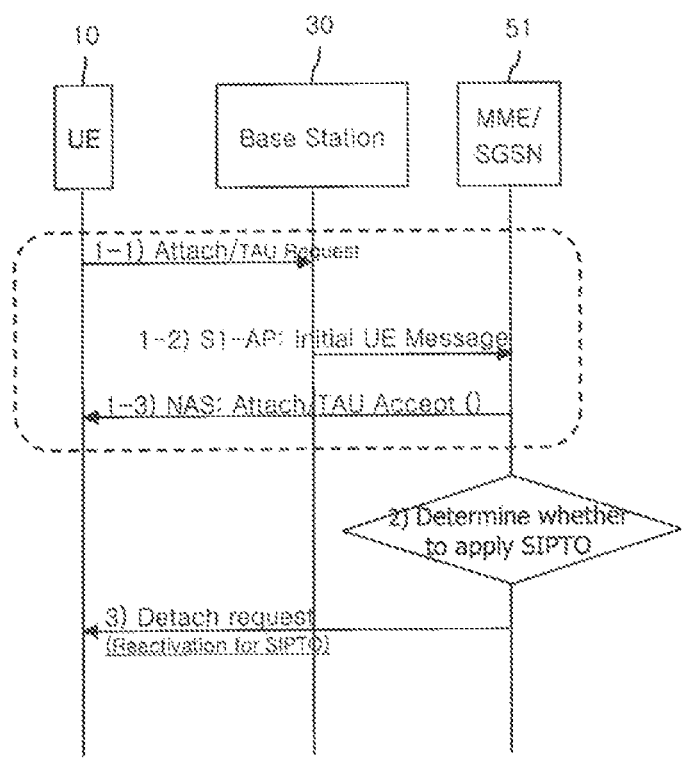
FIG. 9 is a procedural flowchart illustrating the situation of FIG. 8.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, an ME (Mobile Equipment), etc. And, the UE may be implemented as a portable device such as a notebook, a mobile phone, a PDA, a smart phone, a multimedia device, etc, or as an unportable device such as a PC or a vehicle-mounted device.

DEFINITION OF TERMS

Hereinafter, the terms used in this specification will be briefly defined prior to describing with reference to the drawings.

UMTS: It is an abbreviation of Universal Mobile Telecommunication System and denotes the 3rd mobile communication network.

UE/MS: User Equipment/Mobile Station. It denotes a terminal device.

EPS: It is an abbreviation of Evolved Packet System, and denotes a core network supporting a Long Term Evolution (LTE) network. It is a network in the form of an evolved UMTS.

PDN (Public Data Network): An independent network in which a server providing services is located.

PDN connection: A connection from a terminal to a PDN. That is, an association (connection) between a terminal represented by an IP address and a PDN represented by an APN.

PDN-GW (Packet Data Network Gateway): A network node in an EPS network which performs the functions of UE IP address allocation, Packet screening & filtering, charging data collection.

Serving GW (Serving Gateway): A network node in an EPS network which performs the functions of mobility anchor, packet routing, idle mode packet buffering, and triggering MME to page UE.

PCRF (Policy and Charging Rule Function): A node in an EPS network which makes a policy decision to dynamically apply different QoS and charging policies for each service flow.

APN (Access Point Name): As the name of an access point managed by a network, it is provided to the UE. That is, a text string indicating or identifying a PDN. It is necessary to pass through a relevant P-GW in order to access a requested service or network (PDN). An APN denotes a name (text string) predefined within the network to find the P-GW (e.g., internet.mnc012.mcc345.gprs).

Access Control: A control procedure for allowing the UE to be used at an access system such as Home (e)NodeB, or to be moved to another access system.

TEID (Tunnel Endpoint Identifier): An end point ID of a tunnel configured between nodes within a network. It is set up for each section in the unit of each bearer of the UE.

NodeB: It is installed outdoors as a base station of the UMTS network, and the size of the cell coverage corresponds to a macro cell.

eNodeB: It is installed outdoors as a base station of the Evolved Packet Core (EPC) network, and the size of the cell coverage corresponds to a macro cell.

(e)NodeB: It is a term indicating both NodeB and eNodeB.

Home NodeB: It is installed indoors as a base station of the UMTS network, and the size of the cell coverage corresponds to a femto cell.

Home eNodeB: It is installed indoors as a base station of the EPS network, and the size of the cell coverage corresponds to a femto cell.

Home (e)NodeB: It is a term indicating both Home NodeB and Home eNodeB.

Home (e)NodeB Gateway: It is connected to at least one Home (e)NodeB as a gateway performing a role of interfacing with a core network.

Home (e)NodeB Subsystem: It is a form of combining a Home (e)NodeB with a Home (e)NodeB Gateway into a set to manage a radio network. Both the Home (e)NodeB subsystem and the Home (e)NodeB perform a role of managing a radio network to link with a core network, and thus considered as an aggregate form. Accordingly, the terms "Home (e)NodeB" and "Home (e)NodeB subsystem" are interchangeably used below.

MME: It is an abbreviation of Mobility Management Entity, and performs a role of controlling each entity within EPS to provide a session and mobility for the UE.

Closed Subscriber Group (CSG): It denotes a group having at least one Home (e)NodeB. The Home (e)NodeBs belonging to the CSG have a same CSG ID. Each user receives a license for each CSG.

Closed Access Mode: It denotes a mode in which a Home (e)NodeB is operated as a CSG cell. It operates in a method of allowing an access only to a user terminal that is allowed for the relevant cell. In other words, a terminal having an authority for the particular CSG IDs supported by a Home (e)NodeB is only accessible.

Open Access Mode: It denotes a mode in which a Home (e)NodeB is operated in a method similar to a normal cell (non-CSG cell) without the concept of CSG. In other words, it is operated like a normal (e)NodeB.

Hybrid Access Mode: It denotes a mode in which a Home (e)NodeB is operated as a CSG cell, but its access is also allowed to a non-CSG subscriber. The access is allowed for a user terminal having a particular CSG ID that can be supported by the relevant cell to provide a Home (e)NodeB service, and operated in a method in which even a terminal having no CSG authority is allowed to access.

Selected IP Traffic Offload (SIPTO): Technology for offloading traffic to a wired network such as the Internet or the like, without using a network (e.g., 3GPP and 3GPP2) of the mobile communication operator when the UE transmits specific IP traffic through Home (e)NodeB or (e)NodeB.

SIPTO Femto (or Femto SIPTO): Technology for offloading traffic to a wired network such as the Internet or the like, without using a network (e.g., 3GPP and 3GPP2) of the mobile communication operator when the UE transmits specific IP traffic through Home (e)NodeB.

SIPTO Macro (or Macro SIPTO): Technology for offloading traffic to a wired network such as the Internet or the like, without using a network (e.g., 3GPP and 3GPP2) of the mobile communication operator when the UE transmits specific IP traffic through (e)NodeB.

Local IP Access (LIPA): Technology for connecting Home (e)NodeB to a local network (home network in a house or office network in a company), and allowing UE within the Home (e)NodeB to be connected to the local network through the Home (e)NodeB.

Local Gateway: It denotes a gateway for enabling SIPTO through the Home (e)NodeB, i.e., for enabling data to be directly transmitted to a wired network without passing through a core network. The local gateway is located between the Home (e)NodeB and a wired network, thereby creating a bearer between the Home (e)NodeB and the wired network, creating a bearer between the Home (e)NodeB and the local network, and enabling data transmission through the created bearer.

Session: A session is a path for transmitting data, and the unit thereof may be PDN, bearer, IP flow, and the like. The difference between each unit may be classified with an object network overall unit (APN or PDN unit), a unit (bearer unit) classified with QoS within the unit, and a destination IP address unit.

PDN connection: A connection from a terminal to a PDN. That is, an association (connection) between a terminal represented by an IP address and a PDN represented by an APN. It denotes a connection between entities (terminal and PDN GW) in a core network to form a session.

UE Context: Situation information of the UE used to manage the UE in a network, namely, situation information configured with a UE id, mobility (current location, etc.), and an attribute of the session (QoS, priority, etc.).

Local PDN: An independent private network, such as a home network or enterprise network, other than an external PDN.

Local Home(e)NodeB Network: It denotes a network for accessing a local PDN, and includes a Home(e)NodeB and an L-GW.

Local Network: A network including a local Home (e)NodeB network and a local PDN.

OMA DM (Open Mobile Alliance Device Management): A protocol designed for the management of mobile devices such as a cellular phone, a PDA, a portable computer, etc. which performs the functions like configuration, firmware upgrade, and error report.

OAM (Operation Administration and Maintenance): A group of network management functions that provide network fault indication, performance information, and data and diagnosis functions.

NAS configuration MO (Management Object): An MO (Management Object) used to configure parameters related to NAS functionality for a UE.

MTC: Machine Type Communication. It occurs between machines without human interference.

MTC device: A UE that performs a specific object with a communication function over a core network. Example) A vending machine and a meter reading machine.

MTC server: A server on a network that manages an MTC device and sends and receives data to and from the MTC device.

MTC Application: An actual application (remote meter reading, tracking transport of goods, etc.) which uses an MTC device and an MTC server.

MTC Feature: Some features are required according to the functions or attributes of a network for supporting an MTC application, that is, according to the purpose of each application. Examples of which include MTC monitoring (required for remote meter reading prepared for equipment loss), low mobility (rare mobility for vending machines).

NAS (Non-Access-Stratum): The highest stratum of the control plane between a UE and an MME. It supports mobility management, session management, and IP address maintenance between a UE and a network.

NAS level congestion control: A congestion control function of an EPS network, which contains the functions: "APN based congestion control" and "General NAS level Mobility Management.

Hereinafter, congestion control will be described prior to describing with reference to the drawings.

Congestion Control

When network congestion occurs in a 3GPP MTC network, a node (MME, Serving GW, PDN-GW, MSC, SGSN, and GGSN) of a core network performs NAS level congestion control to avoid or control signaling congestion.

The NAS level congestion control contains the functions: "APN based congestion control" and "General NAS level Mobility Management.

The APN based congestion control refers to (E)MM and (E)SM signaling congestion control related to UE/MS and a specific APN (APN associated with a congestion state), and contains APN based Session Management congestion control and APN based Mobility Management congestion control.

On the other hand, the General NAS level Mobility Management refers to avoiding congestion or overload by a node (MME, Serving GW, PDN-GW, MSC, SGSN, GGSN)'s rejecting a Mobility Management signaling request made by UE/MS in a situation of general network congestion or overload.

In general, in the case that a core network performs NAS level congestion control, a back-off timer (Or extended wait timer from lower layer) value is carried in a reject message and transmitted to the UE 100. The UE 100 does not send an (E)MM/(E)SM signaling request to the network until the back-off timer expires.

The back-off timer may be classified into a Mobility Management (MM) back-off timer for controlling (E)MM signaling (e.g., Attach, TAU/RAU requests, etc.) and a Session Management (SM) back-off timer for controlling (E)SM signaling (e.g., PDN connectivity, Bearer Resource Allocation, Bearer Modification, PDP Context Activation, PDP Context Modification requests, etc.). The MM back-off timer operates per UE, and the SM back-off timer operates per APN and per UE, respectively.

To sum up, the MM (Mobility Management) back-off timer is a Mobility Management-related back-off timer used for controlling network congestion, which is a timer that prevents the UE 100 from making attach, TAU/RAU, and service requests during the operation of the timer. However, in case of emergency bearer service or MPS (Multimedia Priority Service), the UE 100 may make a request even if the timer is running.

The MM back-off timer value may be provided from a network (e.g., MME, SGSN, HSS, etc.) or transmitted from lower layers (Access Stratum). Also, it may be set randomly in the range of basic values between 15 to 30 minutes.

The SM (Session Management) back-off timer is a Session Management-related back-off timer used for controlling network congestion, which is a timer that prevents the UE 100 from setting up or changing an associated APN-based session during the operation of the timer. However, in case of emergency bearer service or MPS (Multimedia Priority Service), the UE 100 may make a request even if the timer is running.

The SM back-off timer value may be provided from a network (e.g., MME, SGSN, HSS, etc.), or set randomly within up to 72 hours if the ESM/SM reject cause value is #26 (Insufficient resources).

As described above, when an MM/SM back-off timer value is provided from a network, the network operator sets the corresponding back-off value. MM/SM back-off timer values ranging from several tens of minutes to several hours are set according to a network situation and policy.

As seen above, if the UE/MS 100 is a service user with high priority (multimedia priority service; users having access classes 11-15 and accessing a network), or already has emergency bearer services or wants to initiate them, the relevant service request may be made even if the MM/SM back-off timer is already running.

Hereinafter, a Detach procedure will be described.

Figure 10:
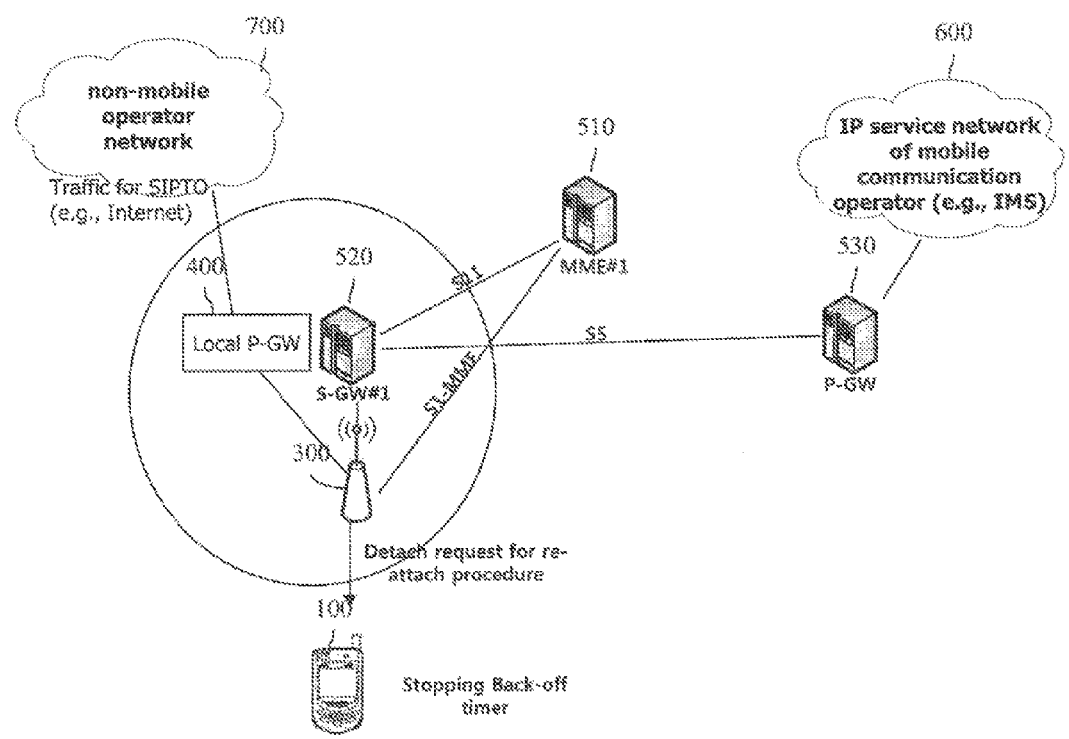
FIG. 10 is an exemplary diagram illustrating a solution according to the present invention.

FIG. 10 is an exemplary diagram illustrating a solution according to the present invention.

Referring to FIG. 10, a mobile communication system such an Evolved Packet System (EPS) is illustrated in an exemplary manner. The EPC system may include a base station 300, local P-GW 400, MME 510, S-GW 520, and P-GW 530. Furthermore, the base station 300 may be (e)NodeB or Home (e)NodeB.

The local gateway 400 is located between the base station 300 and the wired network 700, which is a gateway for enabling SIPTO through the base station 300. The local gateway 400 is allowed to create a session through a path between the base station 300 and the wired network 700.

The local gateway 400 may include part or all of the functions of PDN_GW for an EPS system, or may include part or all of the functions of gateway GPRS support node (GGSN) for UMTS. However, the local gateway 400 may be allowed to generate a bearer through a path between the base station 300 and the wired network 700, and therefore, it is differentiated from P-GW 520 of EPS or GGSN or GGSN of UMTS that generates a bearer through a path to the mobile communication network 600. Thus, it may be called a local P-GW in EPS, or may be called a local GGSN in UMTS.

On the other hand, though the system illustrated in FIG. 10 is on the basis of EPS, SIPTO illustrated in FIG. 10 may be also applied to a 3GPP Universal Mobile Telecommunication System (UMTS). In the 3GPP UMTS, both the function of the control plane in MME 510 and the function of the user plane in S-GW 520 may be carried out in a Serving GPRS Support Node (SGSN) (not shown).

The illustrated UE 100 receives a Detach Request from a network via the base station 300. The Detach Request may be made for re-attach (Detach procedure with re-attach required). If the UE 100 receives a request for a Detach procedure with re-attach required from the network (e.g., MME, SGSN, HSS, etc.), the request may include, for example, PDN-GW restart, PCRF restart, SIPTO (PDN-GW Relocation), O&M triggering, etc.

In general, when the request for a Detach procedure with re-attach required is made, the UE 100 executes the requested detach procedure.

In other words, a Detach Accept message is transmitted to the network. After completion of the Detach procedure, the UE 100 executes re-attach again, and thereafter sets up the previously set-up PDN connection again. As used herein, PDN-GW restart, PCRF restart, PDN-GW relocation denotes the release of a congestion state.

In the current 3GPP standard Rel-10, when the MM back-off timer and the SM back-off timer are respectively or simultaneously operating in the UE 100, the UE 100 is not allowed to make any signaling request related to Mobility management or Session management. However, in the case that emergency call/service or multimedia Priority Service (Service Users) is used, the UE 100 can execute a related procedure even if the back-off timer is running.

In other words, upon reception of the Session Management back-off timer in the EPS Session Management reject message, the UE 100 shall take the following actions until the timer expires:

1) If APN is provided in the rejected EPS Session Management Request message, the UE 100 shall not initiate any Session Management procedures for the congested APN. The UE 100 may initiate Session Management procedures for other APNs.

2) If APN is not provided in the rejected EPS Session Management Request message, the UE 100 shall not initiate any Session Management requests without APN. The UE 100 may initiate Session Management procedures for specific APN.

3) The UE 100 is not allowed to initiate an NAS request for other movement management procedures than Service Users, emergency services and mobile terminated services when the Session Management back-off timer is running.

As seen from above, the UE (MS) 100 operates the SM back-off timer(s) for PDN connection(s) in the following two situations:

i) The UE (MS) 100 sends a PDN connection request with a specific APN to a network, and the network rejects the PDN connection request for the specific APN with an SM back-off timer (in other words, congestion occurs for the specific APN). In this case, the UE/MS runs the SM back-off timer in association with the PDN connection for the specific APN.

ii) The UE (MS) 100 sends a PDN connection request to a network without a specific APN (e.g., PDN connection with a default APN), and the network rejects the PDN connection request with an SM back-off timer. IN this case, the UE (MS) 100 runs the SM back-off timer for the corresponding PDN connection regardless of the specific APN.

However, when the MM/SM back-off timer is running in this manner, the relevant Detach procedure with re-attach required cannot be executed by a basic back-off timer mechanism. In the worst case, the terminal/user cannot be provided with services for 72 hours due to the effects of the MM back-off timer and the SM back-off timer.

In particular, in case of SIPTO (Selected IP Traffic Offload), PDN-GW re-selection is executed to provide services. As a result, a network sends the terminal UE/MSN a request for a Detach procedure with re-attach required in order to execute PDN-GW re-selection. If the MM/SM back-off timer is running in the terminal, this means that other services than Emergency call/service, Multimedia priority service, etc. are being used. Therefore, the Detach procedure, the re-attach procedure, the Session re-establishment, etc. cannot be executed. Accordingly, a serious service interruption occurs.

As seen from above, upon receiving a request for a Detach procedure with re-attach required from a network node (e.g., MME, SGSN, HSS, etc.), it is unclear how to handle the MM/SM back-off timer when the MM back-off timer and the SM back-off timer(s) are running in the UE/MS. As a result, NAS level congestion control cannot be efficiently performed. This problem further deteriorates network resource management, service connectivity, user experience, etc. Accordingly, a method of handling the MM/SM back-off timer(s) needs to be supplemented.

Accordingly, in the present invention, as shown in FIG. 10, when the UE 100 receives a Detach request during the running of the back-off timer, the back-off timer is stopped.

At this point, the UE 100 runs the back-off timer, specifically, the MM back-off timer or SM back-off timer, in the following three cases:

Firstly, only the MM back-off timer is running in the UE (or MS) 100;

Secondly, one MM back-off timer and one SM back-off timer are respectively running in the UE (or MS) 100; and Thirdly, one MM back-off timer and a plurality of SM back-off timers according to different APNs are respectively running in the UE (or MS) 100. The third case may be classified into: A) a case in which a plurality of different APNs are associated with the same PDN-GW; and B) a case in which a plurality of different APNs are associated with a plurality of different PDN-GWs.

First, in the first case, upon receiving a request for a Detach procedure with re-attach required from a network node, the MM back-off timer needs to be stopped to perform the relevant re-attach. In this case, problems about the operation of the SM back-off timer do not matter.

In the second case and A) of the third case, when PDN-GW or SIPTO restart occurs, the MM back-off timer and the SM back-off timer(s) need to be stopped to perform the relevant re-attach. After performing re-attach, a PDN connection that was set up before the detach procedure is set up again.

However, in B) of the third case, when a plurality of different PDN-GWs are restarted, the MM back-off timer and the SM back-off timer(s) need to be stopped to perform the relevant re-attach. After performing re-attach, a PDN connection that was set up before the detach procedure is set up again.

However, it will be quite rare for a plurality of different PDN-GWs to be simultaneously restarted.

Hereinafter, handling of the MM/SM back-off timer(s) according to the present invention will be described in three embodiments. First, a brief description will be made below.

In the first embodiment, the running MM back-off timer is stopped, and all SM back-off timer(s) are stopped, if it is running (Stop MM back-off timer and All SM back-off timer(s), if it is running).

At this time, the first embodiment may be subdivided into two: a) all SM back-off timer(s) associated with an established PDN connection may be stopped; and b) all SM back-off timer(s) may be stopped regardless of an established PDN connection.

In the second embodiment, the running MM back-off timer may be stopped, and all SM back-off timer(s) may not be stopped, if it is running (Stop MM back-off timer and Do NOT Stop SM back-off timer(s), if it is running).

In the third embodiment, the running MM back-off timer is stopped, and the SM back-off timer(s) may be selectively stopped based on a specific APN, if it is running (Stop MM back-off timer and Selectively Stop SM back-off timer(s) if it is running, based on APN with different priority (which is made by Operator policy/preference, local configuration, UE preference, User preference, etc.)).

The above-described three embodiments each may be considered depending on UE/MS, network situations, and Policy/preference/configuration.

In particular, in the third embodiment, when the SM back-off timer(s) is selectively stopped based on a specific APN (APN selection is determined subscription data, Operator policy/preference, UE/User preference, etc.), (1) a method using NAS configuration MO (TO 24.368) and a Network-initiated Detach procedure with re-attach required; and (2) a method for clarifying which SM back-off timer(s) associated with a specific APN in a Detach Request message is to be stopped (that is, indicating specific APN information in a Detach Request message).

Figure 11:
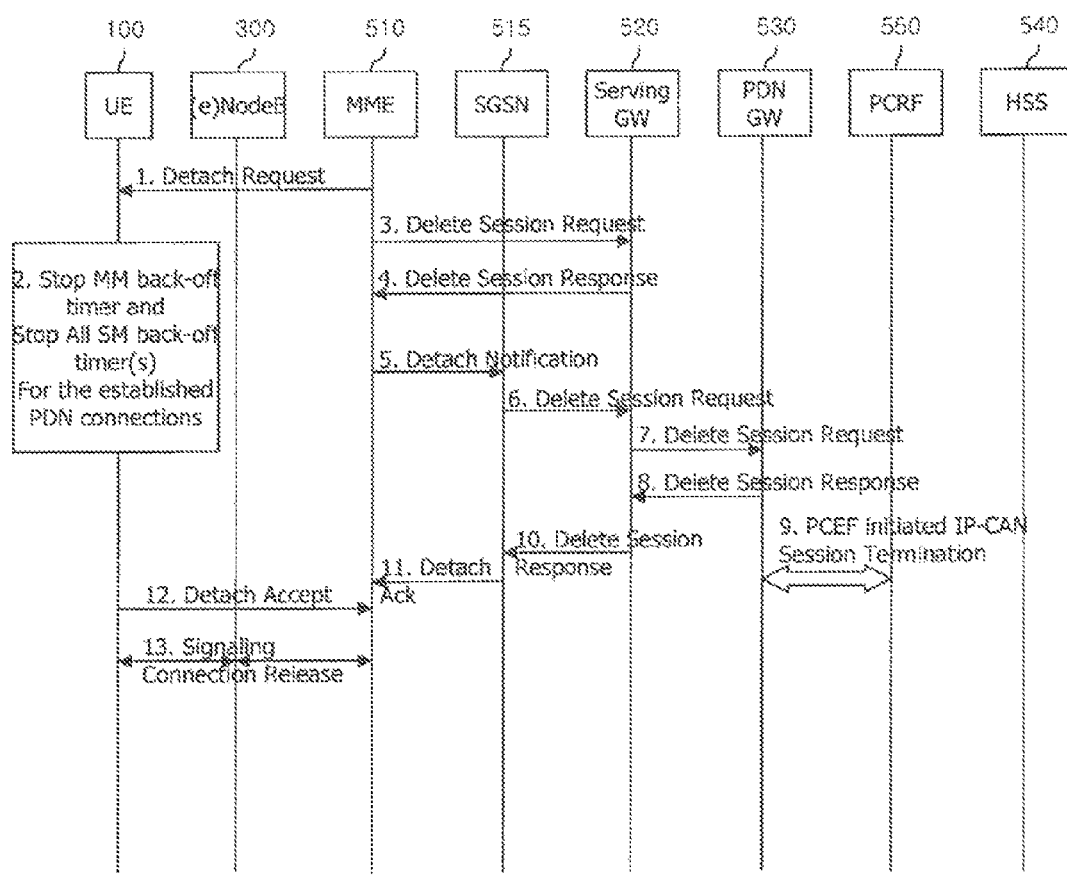
FIG. 11 is a flowchart showing a procedure according to a first embodiment of the present invention.

FIG. 11 is a flowchart showing a procedure according to a first embodiment of the present invention.

Specifically, FIG. 11 shows the first one of the two methods of the above-described first embodiment. That is, according to the first method of the first embodiment, when the UE 100 is running a re-attach back-off timer, if a Detach request message for re-attach, e.g., a Detach request message with the Detach type "re-attach required", is received, the T3346 timer, e.g., the MM back-off timer, may be stopped, and all the T3396 timers, e.g., all the SM back-off timer(s), associated with an established PDN connection may be stopped.

In other words, if the UE (MS) 100 receives a Detach request message for re-attach, for example, a Detach request message with the Detach type "reattach required", from a node (e.g., MME, SGSN, HSS, etc.) of a network, when the T3346 timer (e.g., MM back-off timer) and T3396 timer (e.g., SM back-off timer(s)) are running in the UE (MS) 100, the T3346 (e.g., MM back-off timer) is stopped, and only the T3396 timer(s) (e.g., SM back-off timer(s)) associated with an established PDN connection are stopped.

Afterwards, the UE (MS) 100 executes the requested detach procedure. After completing the detach procedure, a re-attach procedure is executed again, and then the previously established PDN connection is re-established. At this point, the re-established PDN connection may be one applying the SIPTO technology. That is, according to the re-established PDN connection, traffic of the UE 100 may be offloaded to a public network via a local gateway.

This will be described in detail below with reference to FIG. 11.

1) A node of a network, e.g., the MME 510, sends the UE (MS) 100 a Detach request message for re-attach, for example, a Detach request message with the Detach type is "re-attach required".

2) When receiving the Detach request message and the Detach type indicates "re-attach required", the UE (MS) 100 shall deactivate the EPS bearer context(s) including the default EPS bearer context locally without signaling between the UE (MS) 100 and the MME 510.

Upon receipt of a Detach request message with detach type indicating "re-attach required" or "re-attach not required" and no EMM cause IE, the UE 100 is detached only for EPS services.

If the back-off timer(s) is running, the UE (MS) 100 shall stop the T3346 timer, e.g., the MM back-off timer. Also, the UE (MS) 100 shall stop all T3396 timers associated with an established PDN connection, e.g., all SM back-off timer(s).

3) The node, e.g., MME 510, of the network transmits a Delete Session Request message to the serving GW 520.

4) The serving GW 520 transmits the Delete Session Request message to the node, e.g., MME 510, of the network.

5~6) The node, e.g., MME 510, of the network transmits a Detach Notification message to the SGSN 515. Then, the SGSN 515 transmits a Delete Session Request message to the serving GW 520.

7~8) The serving GW 520 transmits the Delete Session Request message to the PDN GW 530, and the PDN GW 530 transmits a Delete Session Response message to the Serving GW 520.

9) The PDN GW 530 executes a session termination procedure, for example, a PCEF-initiated IP CAN Session Termination Procedure, with the PCRF 550. The PCRF 550 is a node in an EPS network which makes a policy decision to dynamically apply different QoS and charging policies for each service flow, and handles a charging process according to the Session Termination Procedure.

10~11) Also, the Serving GW 520 transmits a Delete Session Response message to the SGSN 515, and the SGSN 515 transmits a Detach Ack message to the MME 510.

12) Also, the UE (MS) 100 sends a Detach Accept message to the network to execute a Detach procedure. Then, the UE (MS) 100 enters the EMM-DEREGISTERED state. After completing the Detach procedure, the UE (MS) 100 releases the NAS signaling connection.

13) The UE (MS) 100 transmits and receives signals for releasing a connection with a base station, e.g., (e)NodeB 300, and the base station, e.g., (e)NodeB 300, transmits and receives signals for releasing a connection with the MME 510.

Meanwhile, the UE (MS) 100 executes re-attach after completing the Detach procedure. In other words, the UE (MS) 100 re-establishes the previously established PDN connection after completing the re-attach.

If a Detach request message with the Detach type "re-attach required" has been received but re-attach cannot be automatically performed, user interaction can be made.

Figure 12:
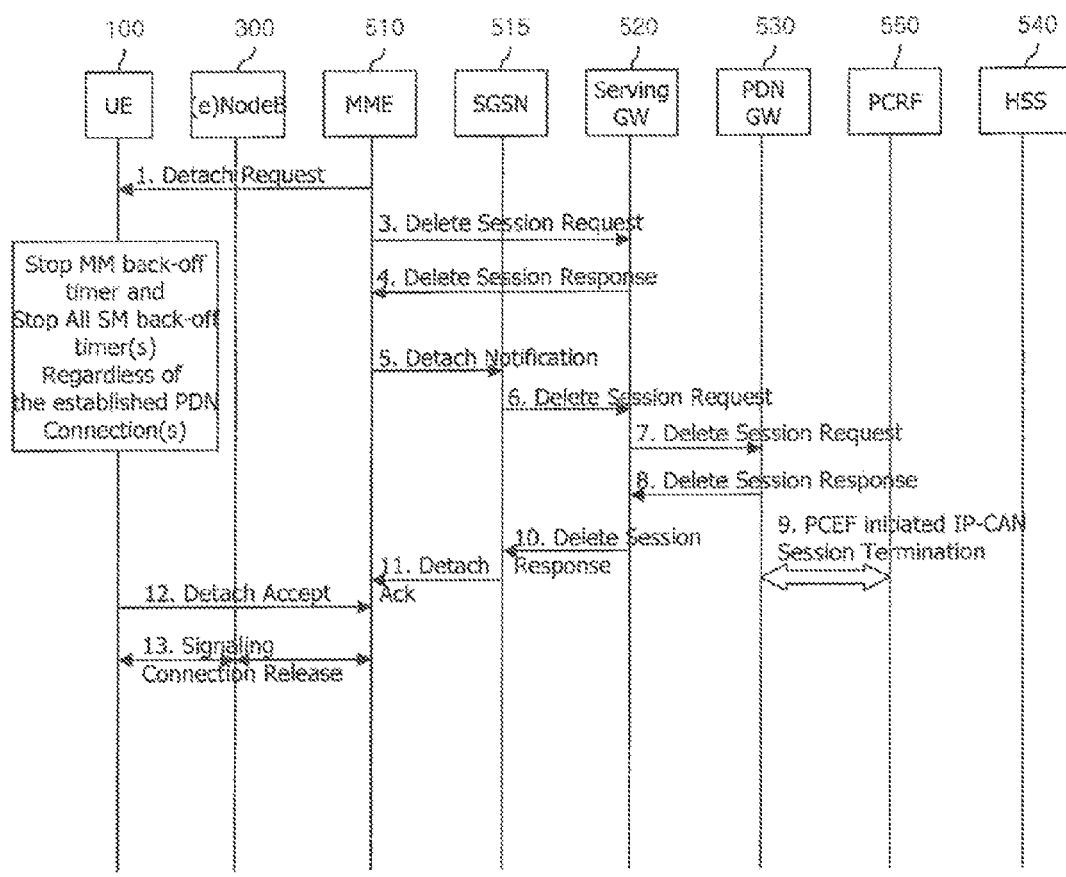
FIG. 12 is another flowchart showing the procedure according to the first embodiment of the present invention.

FIG. 12 is another flowchart showing the procedure according to the first embodiment of the present invention.

Specifically, FIG. 12 shows the first one of the two methods of the above-described first embodiment. That is, according to the second method of the first embodiment, when the UE 100 is running a re-attach back-off timer, if a Detach request message for re-attach, e.g., a Detach request message with the Detach type "re-attach required", is received, the MM back-off timer is stopped, and all SM back-off timer(s) are stopped regardless of an established PDN connection. Afterwards, the UE (MS) 100 executes the requested Detach procedure. After completing the detach procedure, a re-attach procedure is executed again, and then the previously established PDN connection is re-established.

A more detailed description of the drawing is similar to that of FIG. 11, so the description of FIG. 11 will apply.

Figure 13:
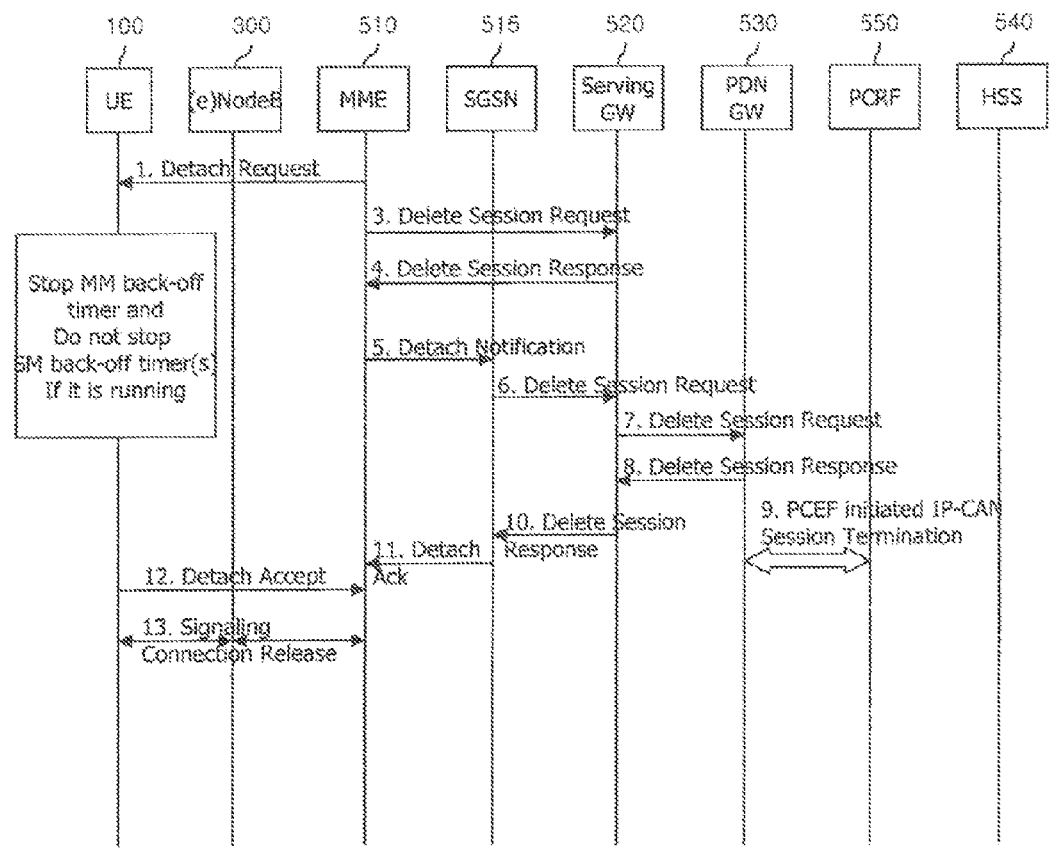
FIG. 13 is another flowchart showing a procedure according to a second embodiment of the present invention.

FIG. 13 is another flowchart showing a procedure according to a second embodiment of the present invention.

The second embodiment will be explained with reference to FIG. 13. When the UE 100 is running a re-attach back-off timer, if a Detach request message for re-attach, e.g., a Detach request message with the Detach type "re-attach required", is received, the MM back-off timer is stopped, and all SM back-off timer(s) are not stopped, if it is running. Afterwards, the UE (MS) 100 executes the requested Detach procedure. After completing the detach procedure, a re-attach procedure is executed again, and then the previously established PDN connection is re-established.

A more detailed description of the drawing is similar to that of FIG. 11, so the description of FIG. 11 will apply.

Figure 14:
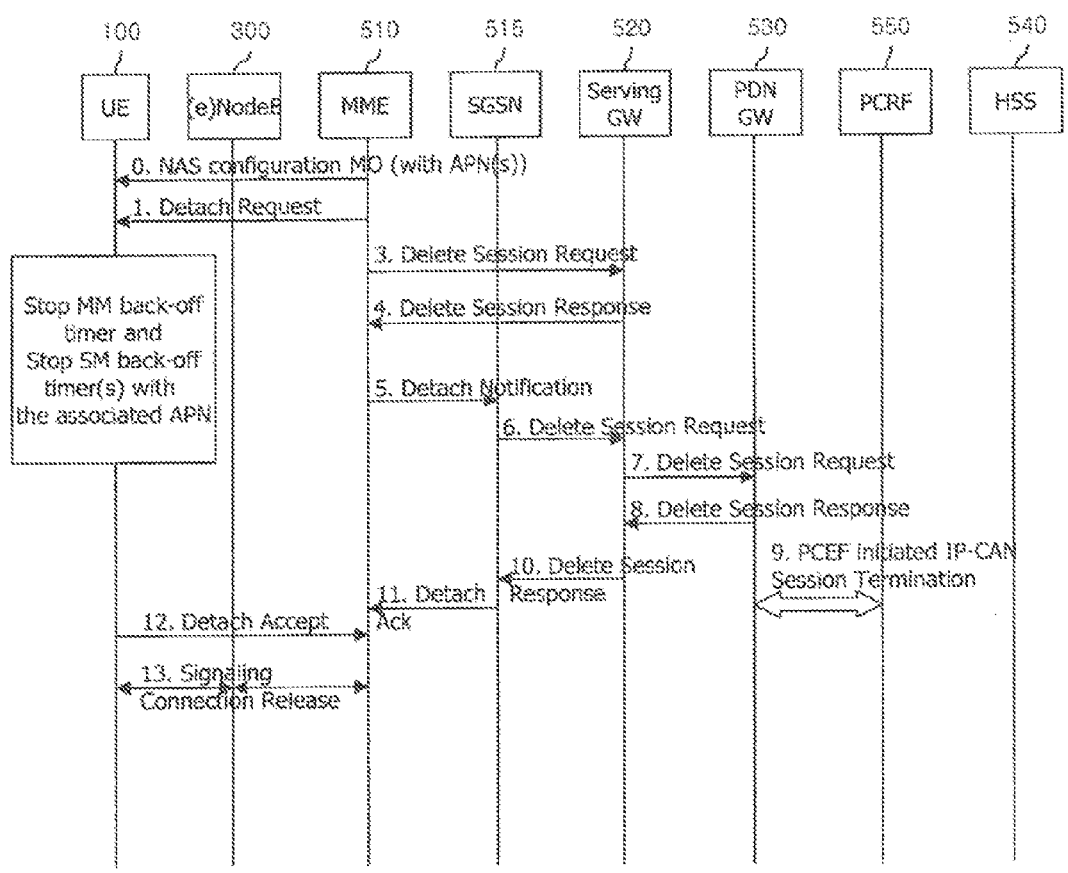
FIG. 14 is another flowchart showing a procedure according to a first method of a third embodiment of the present invention.
Figure 15:
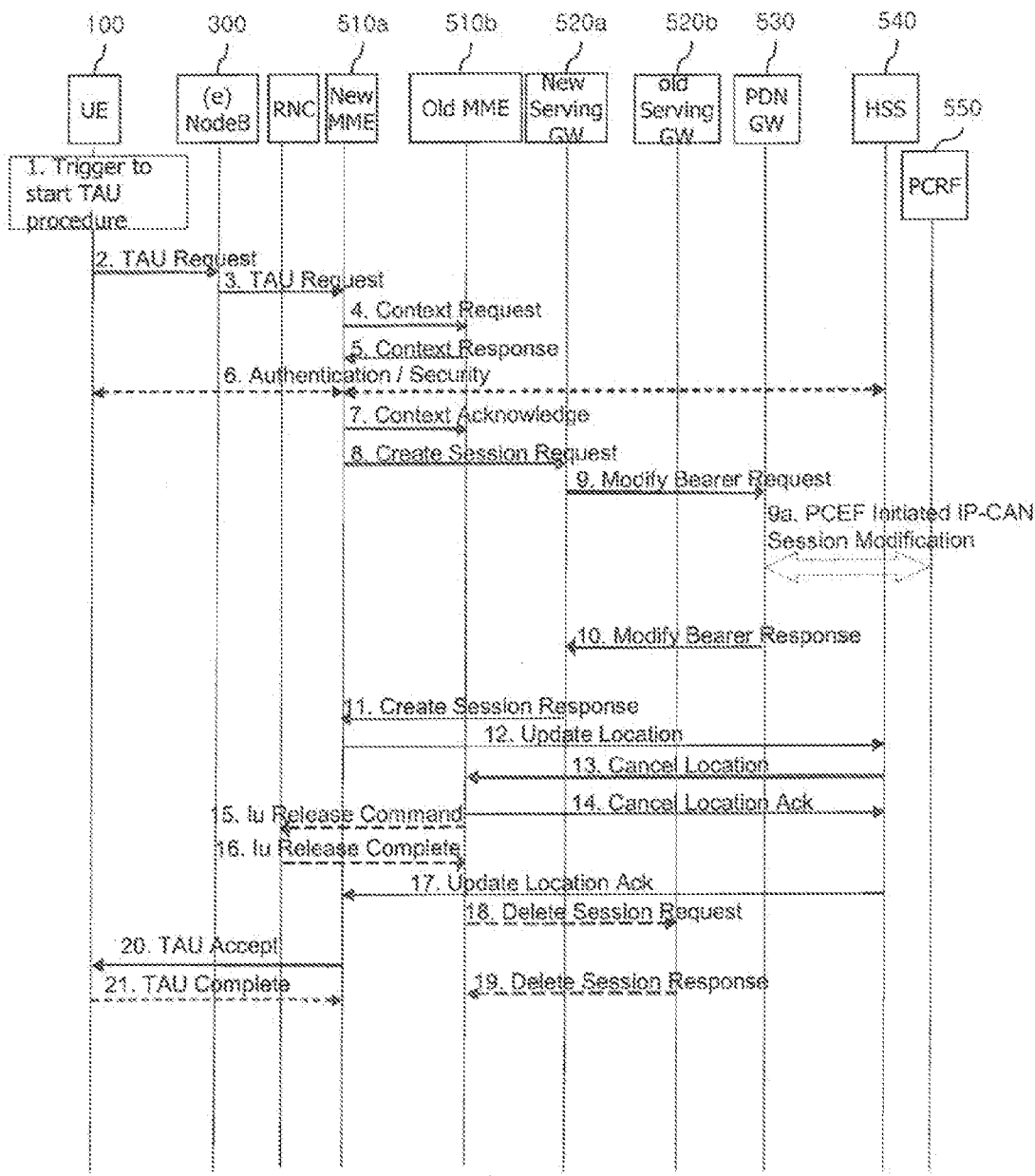
FIG. 15 shows a first modified example of the first method of the third embodiment illustrated in FIG. 14.
Figure 16:
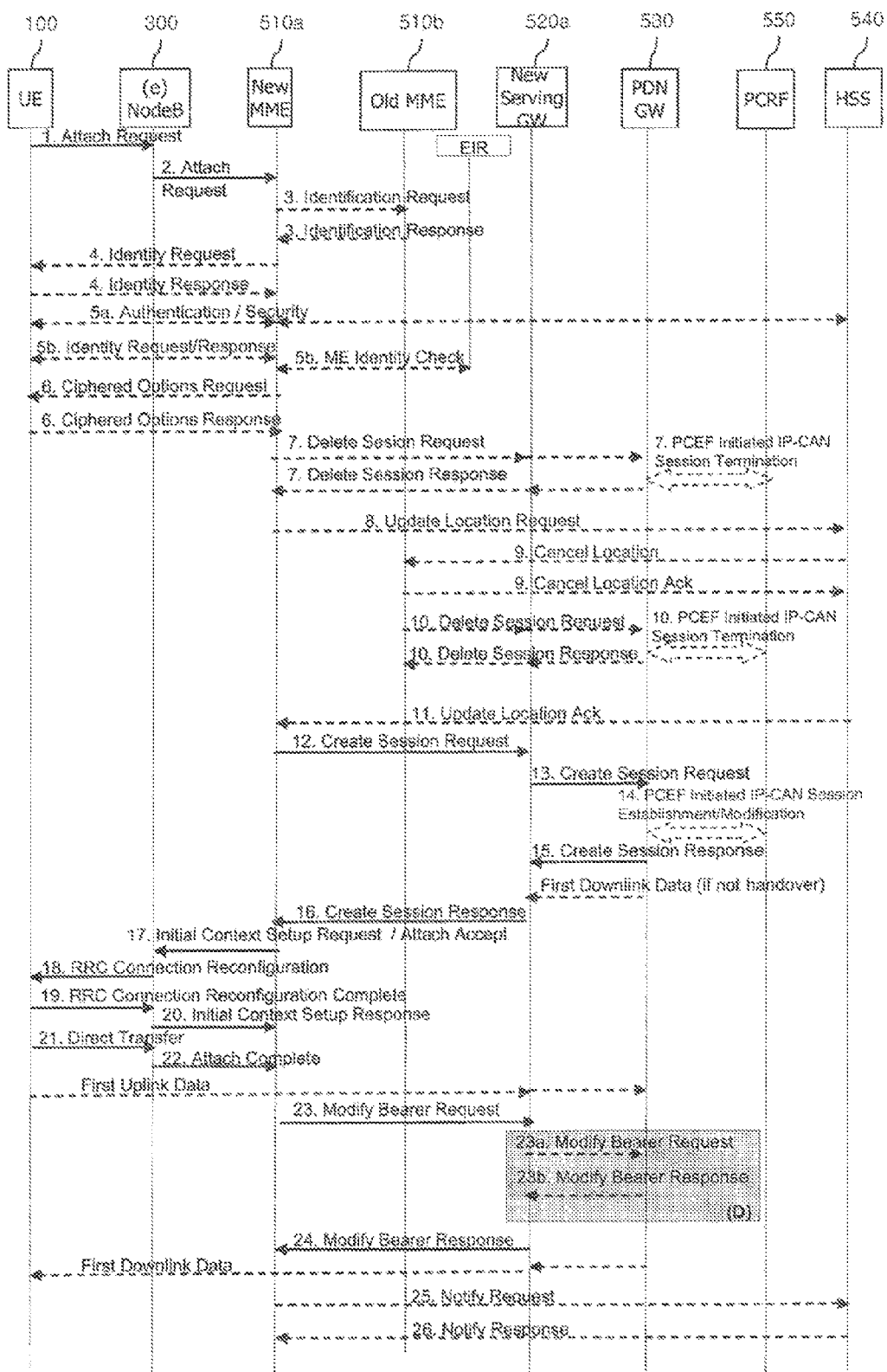
FIG. 16 shows a second modified example of the first method of the third embodiment illustrated in FIG. 14.

FIG. 14 is another flowchart showing a procedure according to a first method of a third embodiment of the present invention. FIG. 15 shows a first modified example of the first method of the third embodiment illustrated in FIG. 14. FIG. 16 shows a second modified example of the first method of the third embodiment illustrated in FIG. 14.

The third embodiment will be explained with reference to FIG. 14. First, a node (e.g., MME, SGSN, HSS, etc.) in a network transmits a Management Object (MO) containing an APN to the UE (MS) 100 prior to transmitting a Detach request message for re-attach to the UE (MS) 100. In other words, the node (e.g., MME, SGSN, HSS, etc.) in the network configures the UE (MS) 100 by an NAS configuration MO including APN(s).

The NAS configuration MO is used to manage configuration parameters related to NAS functionality for a UE supporting provisioning of such information. The MO identifier is represented by urn:oma:mo:ext-3gpp-nas-config:1.0, for example.

APN information is carried and transmitted in the NAS configuration MO (TS 24.368). The APN may be determined by subscription data, Operator's policy/preference. Etc. Based on the MO with APN(s), the UE (MS) 100 is able to identify which APN(s) shall execute a PDN connection establishment after a re-attach.

Namely, if the UE (MS) 100 later receives a Detach request message, for example, with the Detach type "re-attach required" from the node of the network, the UE (MS) 100 stops the SM back-off timer(s) associated with this APN(s), and executes a detach procedure.

In other words, if the UE (MS) 100 receives a Detach request message, for example, with the Detach type "re-attach required" from the network, the UE (MS) 1000 firstly stops the MM back-off timer and stops the SM back-off timer(s) associated with the APN(s), and the UE (MS) 100 executes the requested Detach procedure.

Although the UE 100 has been so far explained as acquiring the APN by the NAS configuration MO, the APN may be acquired through a different procedure as in the modified example illustrated in FIGS. 15 and 16. That is, the APN may be acquired by an Attach procedure or TAU/RAU procedure.

For example, referring to FIG. 15, a process for the UE 100 to execute a TAU procedure is shown.

In the step 9*a*) of the illustrated procedure, the PDN GW 530 executes a session modification procedure, for example, a PCEF-initiated IP-CAN Session Modification procedure, with the PCRF 550. The PCRF 550 is a node in an EPS network which makes a policy decision to dynamically apply different QoS and charging policies for each service flow, and handles a charging process according to the Session Termination Procedure.

At this point, the PDN GW 530 acquires dynamic policy information from the PCRF 540. Specifically, the PDN GW 530 obtains operator policy/configuration information through the PCRF. At this time, related APN information can be acquired. Then, the PDN GW 530 puts the APN in a Modify Bearer Response message and forwards it to a New Serving GW 520*a* to serve the UE 100, and the New Serving GW 520*a* puts the APN in a Create Session Response message and transmits it to a New MME 510*a* to serve the UE 100. The New MME 510*a* puts the APN in a TAU Accept message, and forwards it to the UE 100.

Alternatively, the APN may be forwarded to the New MME 510*a* by the step 17) of the illustrated procedure. That is, the New MME 510*a* executes a relocation procedure with the HSS 540. At this point, the HSS 540 may forward subscription data containing the APN to the New MME 510*a*. Then, the New MME 510*a* puts the APN in a TAU Accept message, and forwards it to the UE 100.

By taking another example, a process for the UE 100 to execute an Attach procedure is shown with reference to FIG. 16.

In the step 11) of the illustrated procedure, the New MME 510*a* executes a relocation procedure with the HSS 540. At this point, the HSS 540 may forward subscription data containing the APN to the New MME 510*a*. Then, the New MME 510*a* puts the APN in an Attach Accept message and forwards it to the (e)NodeB 300, or put the APN in an RRC connection reconfiguration message and forwards it to the UE 100.

Alternatively, in the step 14) of the illustrated procedure, the PDN GW 530 obtains operator policy/configuration information through the PCRF. At this time, related APN information can be acquired. Then, the PDN GW 530 puts the APN in a Create Session Response message, and forwards it to a New Serving GW 520a to serve the UE 100, and the New Serving GW 520a puts the APN in a Create Session Response message and transmits it to a New MME 510a to serve the UE 100. The New MME 510a puts the APN in an Attach Accept message, and forwards it to the UE 100.

Figure 17:
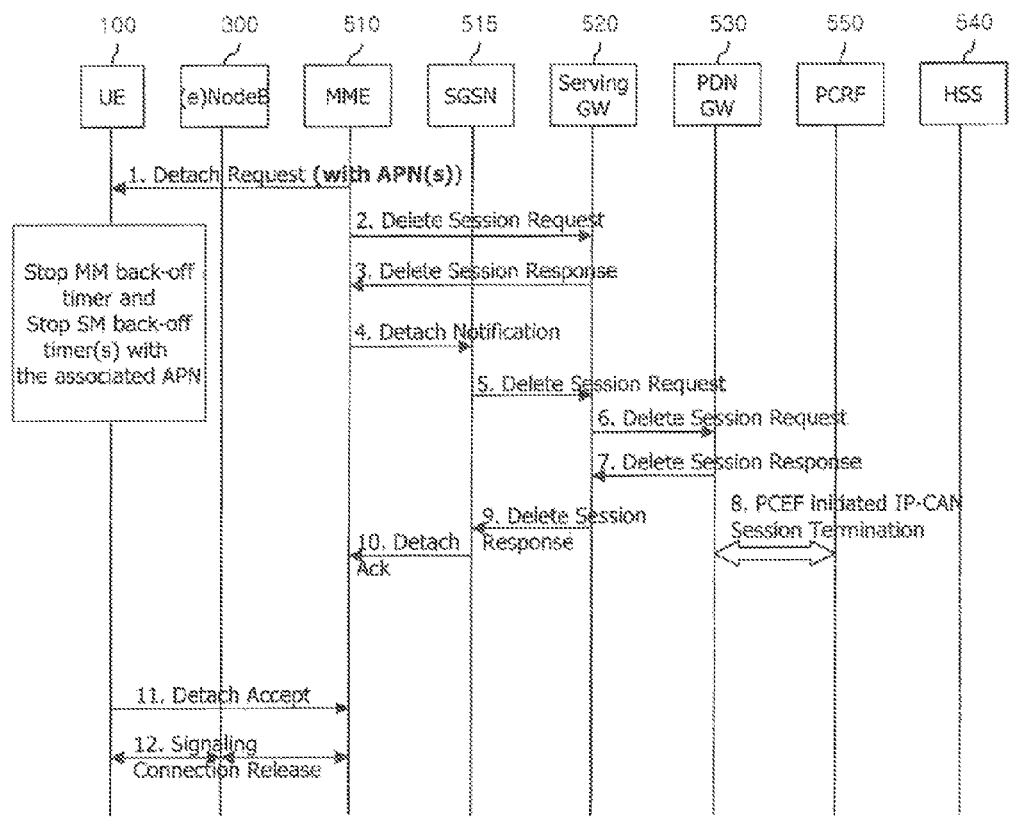
FIG. 17 is another flowchart showing a procedure according to a second method of the third embodiment of the present invention.

FIG. 17 is another flowchart showing a procedure according to a second method of the third embodiment of the present invention.

The second method of the third embodiment will be explained with reference to FIG. 17. First, when a node (e.g., MME, SGSN, HSS, etc.) in a network transmits a Detach request message for re-attach, e.g., a Detach request message with the Detach type "re-attach required", to the UE (MS) 100, APN information is carried in the message.

Then, the UE (MS) 100 is able to identify which APN(s) shall execute a PDN connection establishment after a re-attach based on the APN(s) contained in the Detach request message. The APN may be acquired by any one of the above-explained steps with reference to FIGS. 15 and 16.

In this way, when the UE (MS) 100 receives a Detach request from the network, the UE (MS) 100 firstly stops the MM back-off timer, and then stops the SM back-off timer(s) running in association with the APN(s).

Afterwards, the UE (MS) 100 executes the requested Detach procedure. After completing the detach procedure, a re-attach procedure is executed again, and then the PDN connection(s) previously established in association with the APN(s) is re-established.

A more detailed description of the drawing is similar to those of FIGS. 11 through 14, so the foregoing description will apply.

Figure 18:
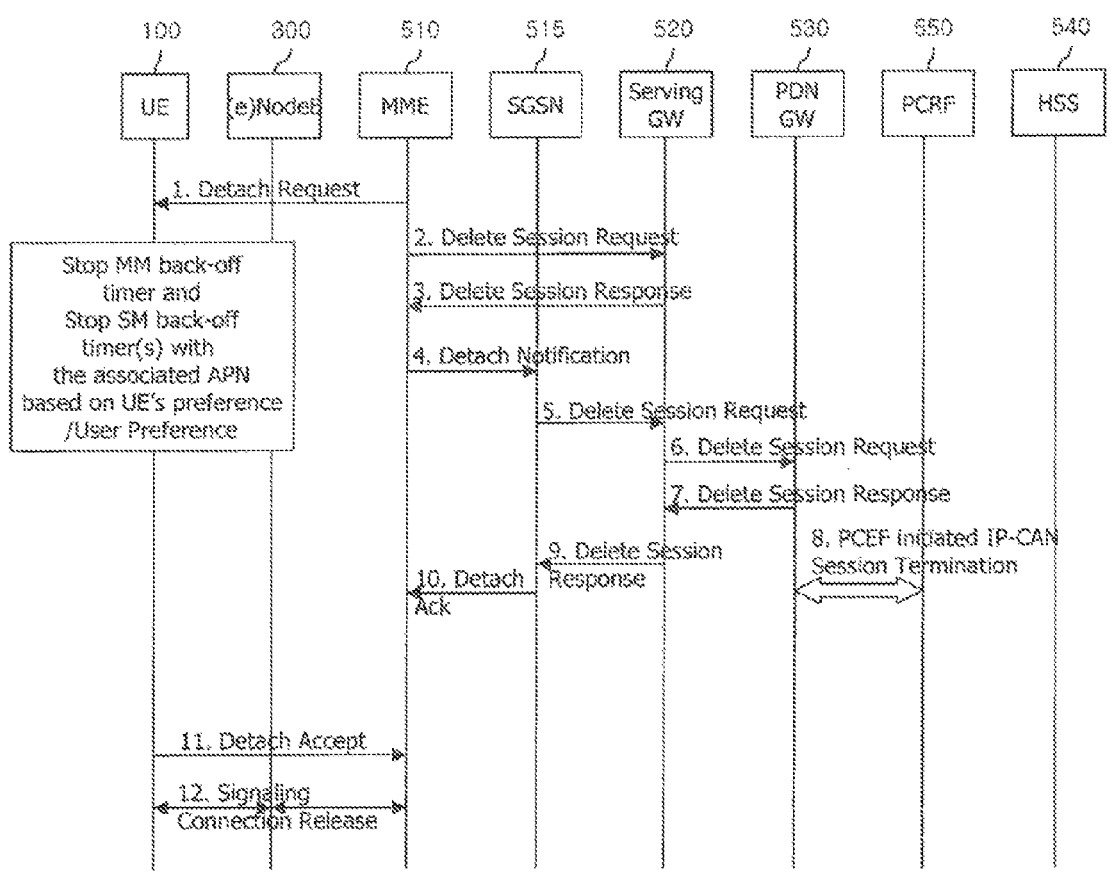
FIG. 18 is another flowchart showing a procedure according to a third method of the third embodiment of the present invention.

FIG. 18 is another flowchart showing a procedure according to a third method of the third embodiment of the present invention.

The third method of the third embodiment will be explained with reference to FIG. 18. First, when a node (e.g., MME, SGSN, HSS, etc.) in a network transmits a Detach request message for re-attach, e.g., a Detach request message with the Detach type "re-attach required", to the UE (MS) 100, the UE (MS) 100 determines which APN(s) shall execute a PDN connection establishment after a re-attach by the UE setting or user setting.

Afterwards, the UE (MS) 100 stops the MM back-off timer, and stops the SM back-off timer(s) running in association with the determine APN(s).

Afterwards, the UE (MS) 100 executes the requested Detach procedure. After completing the detach procedure, a re-attach procedure is executed again, and then the PDN connection(s) previously established in association with the APN(s) is re-established.

Figure 19:
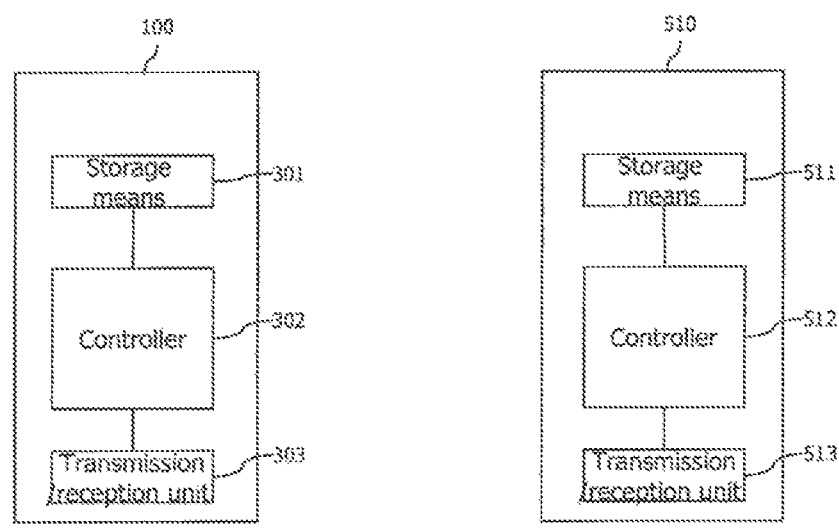
FIG. 19 is a block diagram of the UE and MME according to the present invention.

FIG. 19 is a block diagram of the UE 100 and MME 510 according to the present invention.

As shown in FIG. 19, the UE 100 includes storage means 101, a controller 102, and a transmission/reception unit 103. The MME 510 includes storage means 511, a controller 512, and a transmission/reception unit 513.

The storage means 101 and 511 stores the methods illustrated in FIGS. 10 through 19.

The controllers 102 and 512 control the storage means 101 and 511 and the transmission/reception units 103 and 513. Specifically, the controllers 102 and 512 execute the methods stored in the storage means 101 and 511, respectively. The controllers 102 and 512 transmit the above-mentioned signals through the transmission/reception units 103 and 513.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for performing a detach procedure in a terminal that includes a mobility management (MM) timer and a plurality of session management (SM) timers, the method performed by the terminal and comprising:
   receiving a detach request message from an entity within a network,
   wherein the plurality of SM timers includes:
      a first SM timer associated with a first APN (Access Point Name), and
      a second SM timer not associated with any APN; and
   when a detach type in the detach request message indicates "re-attach required":
      stopping the MM timer if the MM timer is running;
      stopping at least one of the first SM timer and the second SM timer according to whether APN information indicates a specific APN, when the received detach request message includes the APN information and the first and the second SM timers are running,
      wherein if the specific APN is the first APN, the first SM timer associated with the first APN is stopped;
      stopping the first SM timer and the second SM timer, when the received detach request message excludes the APN information and the first and the second SM timers are running;
   transmitting a detach accept message to the entity within the network; and
   performing a re-attach procedure to reestablish a Packet Data Network (PDN) connection with a specific APN indicated by the APN information, if the detach request message includes the APN information.

2. The method of claim 1, further comprising:
   running the MM timer upon receipt of an attach reject message, a tracking area update/routing area update reject message, or a service-reject message, or when a congestion of a core network is indicated, or according to signaling received from the lower layer.

3. The method of claim 1, further comprising:
   upon expiry of the MM timer, initiating an attach, performing a tracking area update/routing area update, or performing a service request procedure.

4. The method of claim 1, further comprising:
   running one of the plurality of SM timers when an Activate PDP Context is rejected, an Activate MBMS Context is rejected, an Activate Secondary PDP Context is rejected, a Modify PDP Context is rejected, PDP connectivity is rejected, Bearer Resource Modification is rejected, or Bearer Resource Allocation is rejected.

5. The method of claim 1, further comprising:
   upon expiry of one of the plurality of SM timers, performing an Activate PDP Context request, performing an Activate Secondary PDP Context request, performing a Modify PDP Context request, performing an Activate Default Evolved Packet System (EPS) Bearer Context Request, performing an Activate Dedicated EPS Bearer request, or performing a Modify EPS Bearer Context request.

6. The method of claim 1, further comprising:
   deactivating an Evolved Packet System (EPS) Bearer Context including a Default EPS Bearer Context without signaling with nodes within the network when the detach type in the detach request message indicates "re-attach required".

7. The method of claim 1, further comprising:
entering an Evolved Packet System (EPS) Mobility Management (EMM) deregistered state after transmitting the detach accept message to the entity within the network.

8. The method of claim 1, further comprising:
releasing an existing Non-Access Stratum (NAS) signaling connection after completion of a detach procedure.

9. The method of claim 1, further comprising:
running the MM timer if a value for the MM timer is included in a reject message from the entity within the network.

10. The method of claim 1, further comprising:
running one of the plurality of SM timers if a value for the one of the plurality of SM timers is included in a reject message from the entity within the network.

11. A terminal, comprising:
a mobility management (MM) timer and a plurality of session management (SM) timers,
wherein the plurality of SM timers includes:
 a first SM timer associated with a first APN (Access Point Name), and
 a second SM timer not associated with any APN;
a receiver configured to receive a detach request message from an entity within a network;
a transmitter; and
a controller configured to:
 when a detach type in the detach request message indicates "re-attach required":
  stop the MM timer if the MM timer is running;
  stop at least one of the first SM timer and the second SM timer according to whether APN information indicates a specific APN, when the received detach request message includes the APN information, and the first and the second SM timers are running,
   wherein if the specific APN is the first APN, the first SM timer associated with the first APN is stopped;
  stop the first SM timer and the second SM timer, when the received detach request message excludes the APN information, and the first and the second SM timers are running;
 control the transmitter to transmit a detach accept message to the entity within the network; and
 perform a re-attach procedure to reestablish a Packet Data Network (PDN) connection with a specific APN indicated by the APN information, if the detach request message includes the APN information.

12. The terminal of claim 11, wherein the controller is further configured to deactivate an Evolved Packet System (EPS) Bearer Context including a Default EPS Bearer Context without signaling with nodes within the network when the detach type in the detach request message indicates "re-attach required".

13. The terminal of claim 11, wherein the controller is further configured to enter an Evolved Packet System (EPS) Mobility Management (EMM) deregistered state after transmitting the detach accept message to the entity within the network.

14. The terminal of claim 11, wherein the controller is further configured to:
 release an existing Non-Access Stratum (NAS) signaling connection after completion of a detach procedure.

15. The terminal of claim 11, wherein the controller is configured to run the MM timer if a value for the MM timer is included in a reject message from the entity within the network.

16. The terminal of claim 11, wherein the controller is configured to run one of the plurality of SM timers if a value for the one of the plurality of SM timers is included in a reject message from the entity within the network.

* * * * *